United States Patent [19]
Yamakaji et al.

[11] Patent Number: 6,041,880
[45] Date of Patent: Mar. 28, 2000

[54] FRAME STRUCTURE OF A WORKING VEHICLE

[75] Inventors: Naoki Yamakaji; Yoshitaka Ishimaru; Takatoshi Meno; Hiroyasu Nagata; Toshio Tsuda, all of Amagasaki, Japan

[73] Assignee: Kanzaki Kokyukoki Mfg. Co., Ltd., Japan

[21] Appl. No.: 08/969,548

[22] Filed: Nov. 13, 1997

[30] Foreign Application Priority Data

| Nov. 26, 1996 | [JP] | Japan | 8-315164 |
| Dec. 24, 1996 | [JP] | Japan | 8-343889 |
| Aug. 18, 1997 | [JP] | Japan | 9-221703 |

[51] Int. Cl.[7] .................................................. B60K 17/00
[52] U.S. Cl. .......................... 180/346; 180/380; 280/786
[58] Field of Search ................................... 180/380, 374, 180/346; 280/786

[56] References Cited

U.S. PATENT DOCUMENTS

| 1,243,862 | 10/1917 | Olson | 180/380 |
| 3,266,590 | 8/1966 | Hungerford | 180/380 |
| 4,273,207 | 6/1981 | Sivers et al. | 180/380 |
| 4,924,961 | 5/1990 | Bernardi | 180/374 |

FOREIGN PATENT DOCUMENTS 7-10014  1/1995  Japan .

*Primary Examiner*—Kenneth R. Rice
*Attorney, Agent, or Firm*—Sterne Kessler Goldstein & Fox P.L.L.C.

[57] ABSTRACT

A frame is disposed between an engine and a transmission casing and is made of three sheet metal parts; an engine mounting part, a transmitting shaft covering part and a transmission casing mounting part. The transmitting shaft covering part consists of two laterally or vertically separable halves which join each other to form a barrel. One end of each half is fixed to the engine mounting part, while the other end is fixed to the transmission casing mounting part. Reinforcing members are disposed below a transmitting shaft housed in the transmitting shaft covering part. An expanded portion is disposed at the other end of the transmitting shaft covering part. An opening edge of the expanded portion is fixed to the transmission casing mounting part.

9 Claims, 26 Drawing Sheets

FRAME STRUCTURE OF A WORKING VEHICLE

BACKGROUND OF THE INVENTION

1. Field of the Invention

The present invention relates to a technique in construction and reinforcement of a housing constituting a body frame of a working vehicle, which houses power transmitting devices such as a main clutch, a damper coupling and the like, interposed between an engine and a transmission casing so as to be united together, and a technique in disposing a steering column, which houses a steering shaft, and a changing apparatus, which changes the rotational movement of the steering shaft into the steering movement of front driven wheels, on the housing.

2. Related Art

Conventionally, for the purpose of integrally connecting a transmission casing to an engine of a tractor, a front end surface of a cylindrical or inversely U-like shaped housing constituting a body frame is fixed to a rear end surface of an engine and a rear end surface of the housing is fixed to a front end surface of a transmission casing. The housing is entirely formed by molding.

Japanese Laid Open Gazette Hei. 7-10014, describes an example of a conventional technique for supporting a steering unit where a lower portion of a cylindrical steering column, rotatably housing a steering shaft, is fixed onto a support bracket, and an upper surface of a hydraulic control unit, which supplies operating oil to a power steering hydraulic cylinder proportionally to the rotation of the steering shaft, is fixed to the lower surface of the support bracket.

A molded frame disposed between the engine and the transmission casing according to the former of the above conventional techniques is disadvantageous in that extra time and cost are required to produce the mold and the molded frame adds too much weight to the working vehicle. Alternatively, if the engine and the transmission casing are connected through a sheet metal frame, complicated sheet metal processing and construction are required, because sheet metal, which is simply bent to be cylindrical or inversely U-like shaped, lacks strength.

A support bracket, onto which the lower portion of the steering column and the upper surface of the hydraulic control unit are fixed, according to the latter conventional technique is also lacking in strength, because it is made of a plate, extending from and supported on one side by a panel frame disposed in a dashboard. Also, the upper portion of the steering column is supported by and fixed to a panel frame, so that the supporting point of the steering column tends toward a high position. Thus, the steering unit lacks stability and is liable to swing. Furthermore, the supporting members, which support the steering unit, are not used to reinforce the clutch housing.

SUMMARY OF THE INVENTION

In order to solve the above mentioned problems, the present invention is constructed as follows:

A frame of a working vehicle for integrally connecting an engine with a transmission casing consisting of three sheet metal parts, an engine mounting part, a transmitting shaft covering part and a transmission casing mounting part. The transmitting shaft covering part is made of two halves, which are separable laterally or vertically, joined with each other so as to form a barrel. One end of the transmitting shaft covering part is fixed to the engine mounting part, while the other end is fixed to the transmission casing mounting part.

A reinforcing member is disposed between the two halves of the transmitting shaft covering part below a transmitting shaft housed in the transmitting shaft covering part.

The engine mounting part is formed in the shape of a bowl. One end of each half of the transmitting shaft covering part is fixed to the external wall of the bottom of the bowl. A base frame for supporting a steering unit is disposed over an upper portion of the bowl shaped portion of the engine mounting part and each half of the transmitting shaft covering part.

An opening edge of the engine mounting part is bent outwardly so as to form a flange, and another reinforcing member is fixed onto the back surface of the flange.

The transmission casing mounting part is a plate shaped to correspond with the front surface of the transmission casing. An expanded portion is disposed at one end of the transmitting shaft covering part. The open end of the expanded portion is fixed to the transmission casing mounting part.

The frame is disposed between the engine and the transmission casing and houses a power transmitting mechanism which engages the engine with the transmission casing. A mounting plate consisting of an upper plate portion and a pair of leg plate portions is disposed on the frame. A steering column housing a steering shaft is attached to an upper surface of the upper plate portion, and a changing apparatus, which is connected with the steering shaft and changes the rotational movement of the steering wheel into the steering movement of the driven wheels, is attached to a lower surface of the upper plate portion. The changing apparatus is a hydraulic control valve, which changes the rotational movement of the steering wheel into the expansion and contraction of a power steering cylinder. A flange disposed at the base of the steering column is screwed to the casing of the changing apparatus through the mounting plate.

DETAILED DESCRIPTION OF THE PREFERRED EMBODIMENTS

A detailed description of a working vehicle of the present invention will be described according to FIG. 1 and others.

Figure 1:
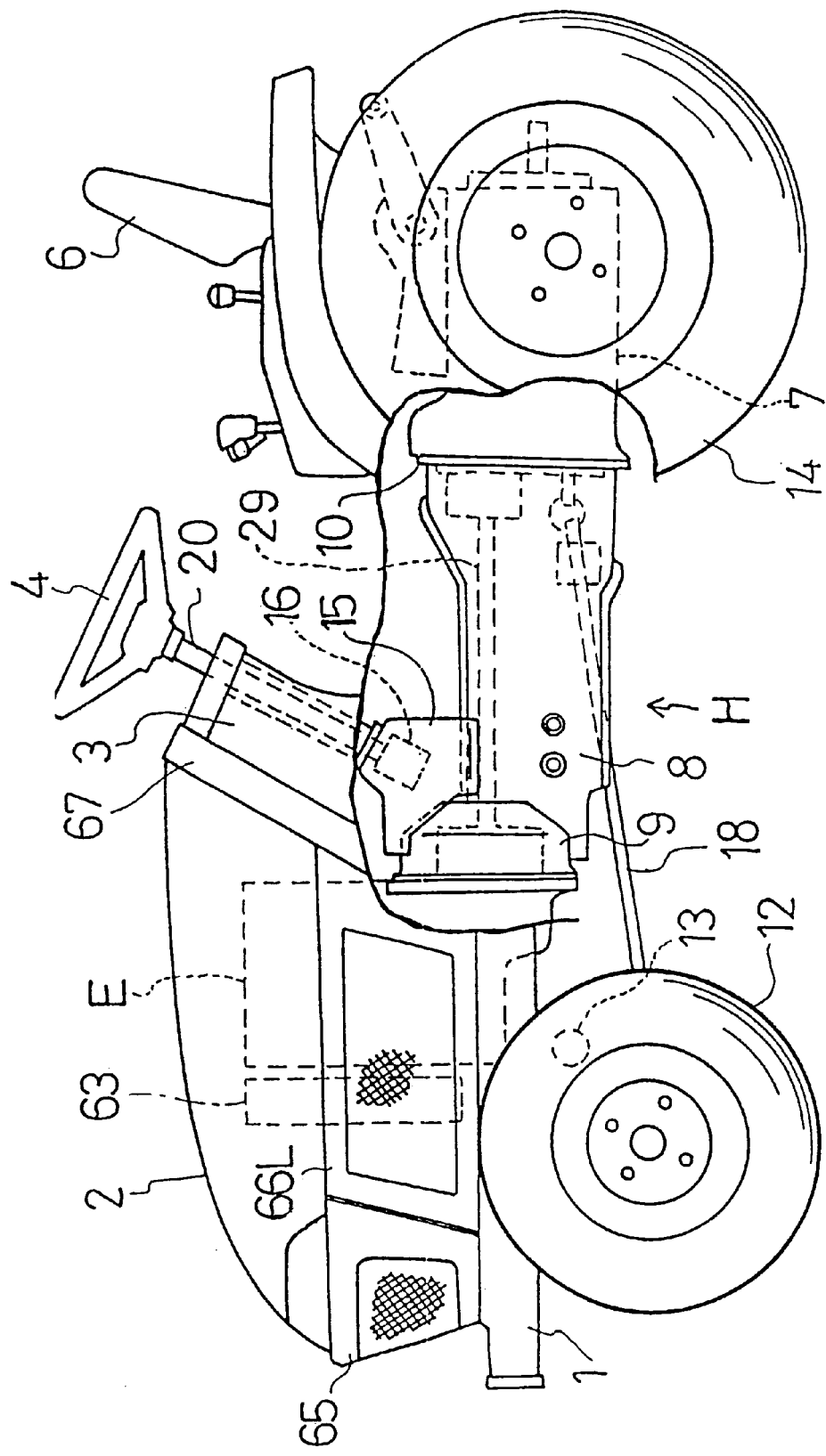
FIG. 1 is a side view of a working vehicle provided with a frame structure of the present invention.
Figure 8:
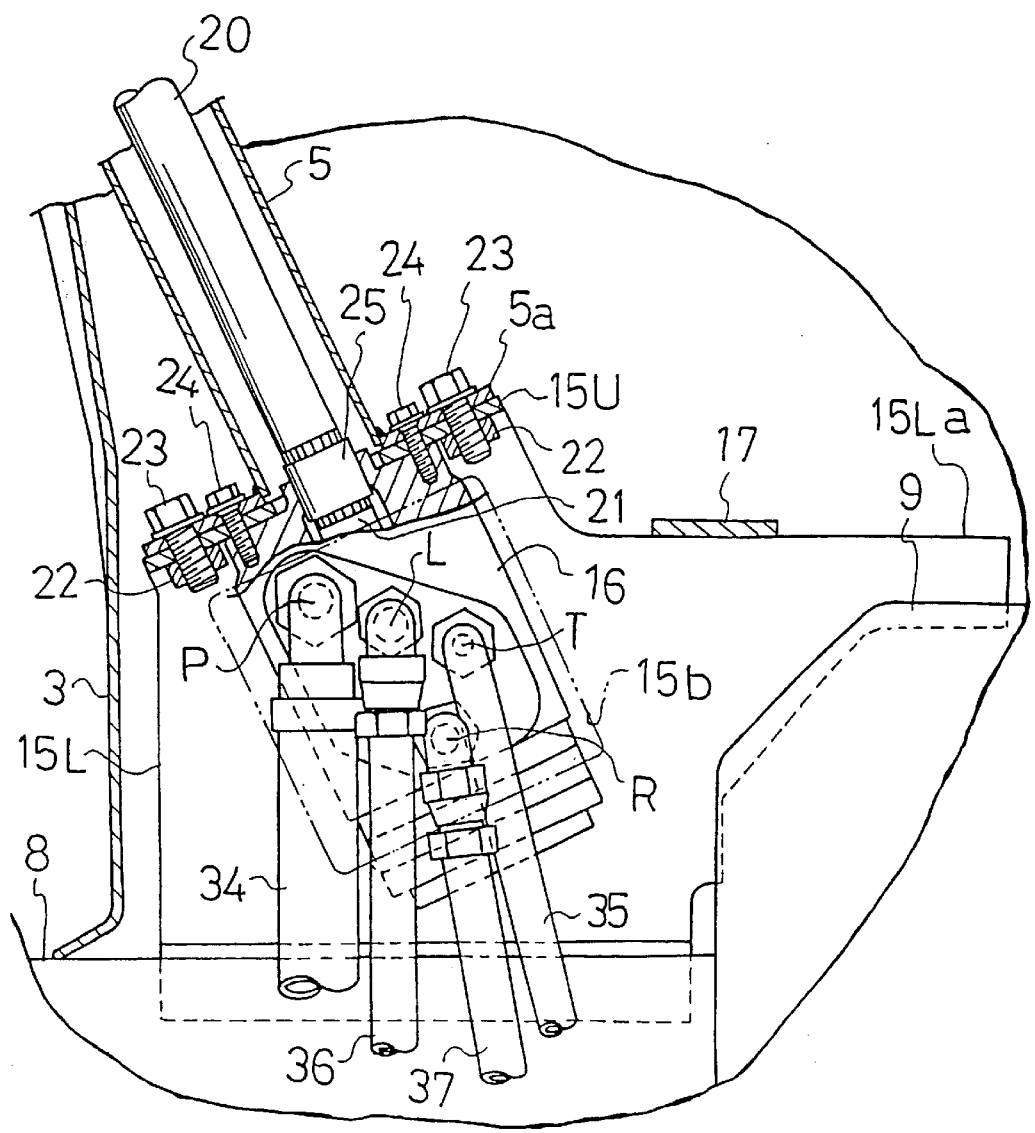
FIG. 8 is a sectional side view of a base portion of steering column 5 attached to mounting plate 15 on frame H.
Figure 9:
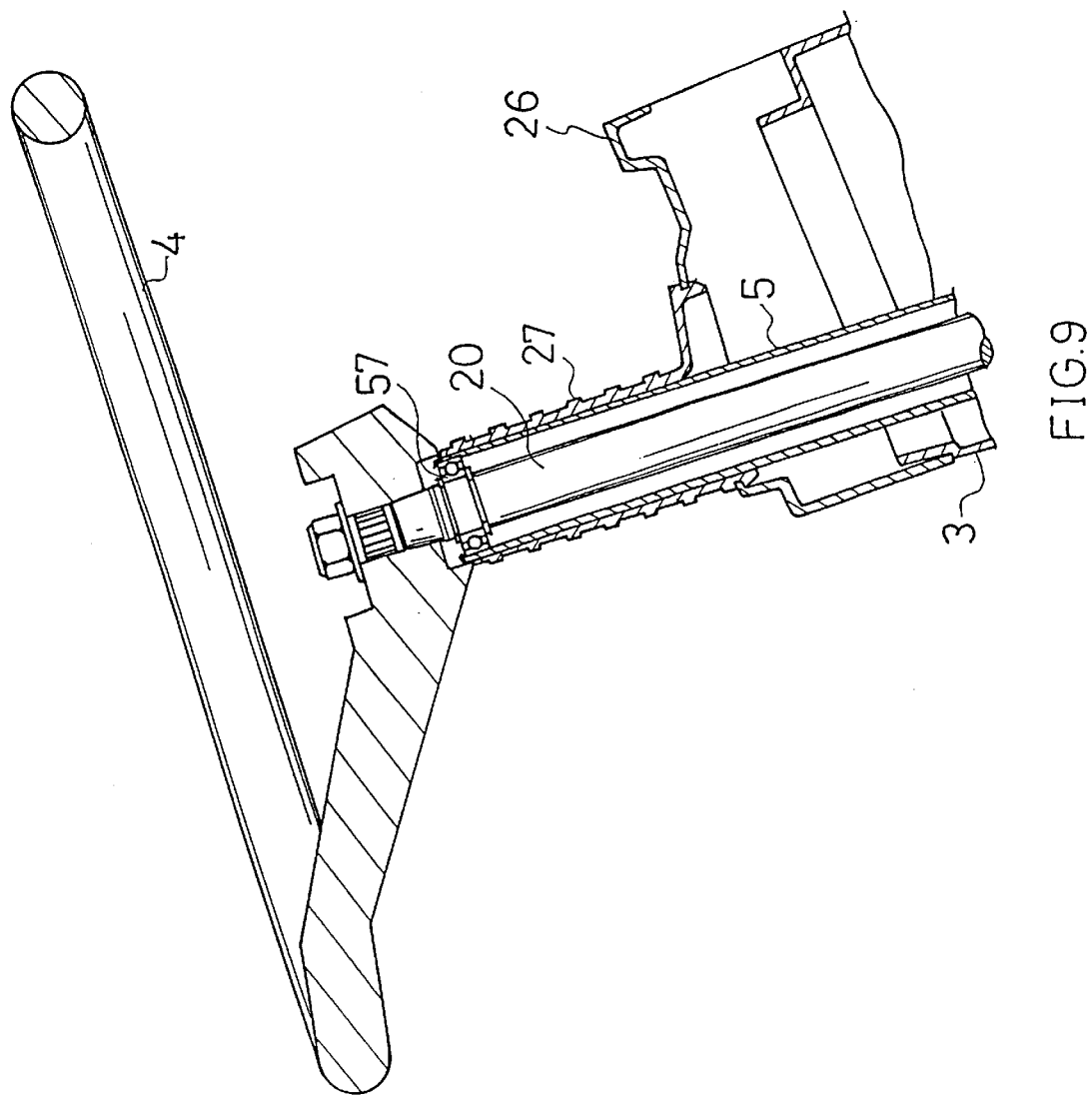
FIG. 9 is a sectional side view of an upper portion of steering column 5 rotatably supporting steering shaft 20 in a conventional manner.
Figure 10:
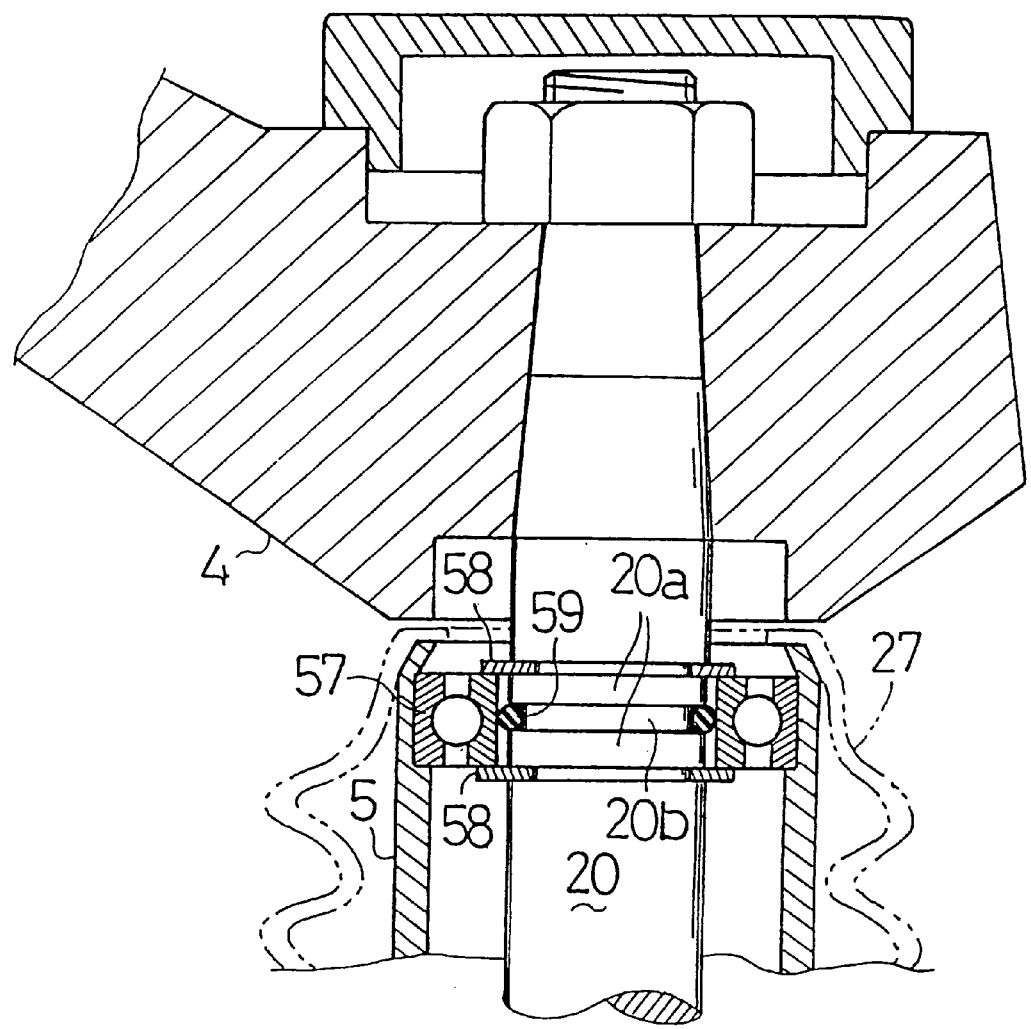
FIG. 10 is a sectional front view of the upper portion of steering column 5 rotatably supporting steering shaft 20, wherein steering column 5 is resistant to the diametric vibration of steering shaft 20.
Figure 11:
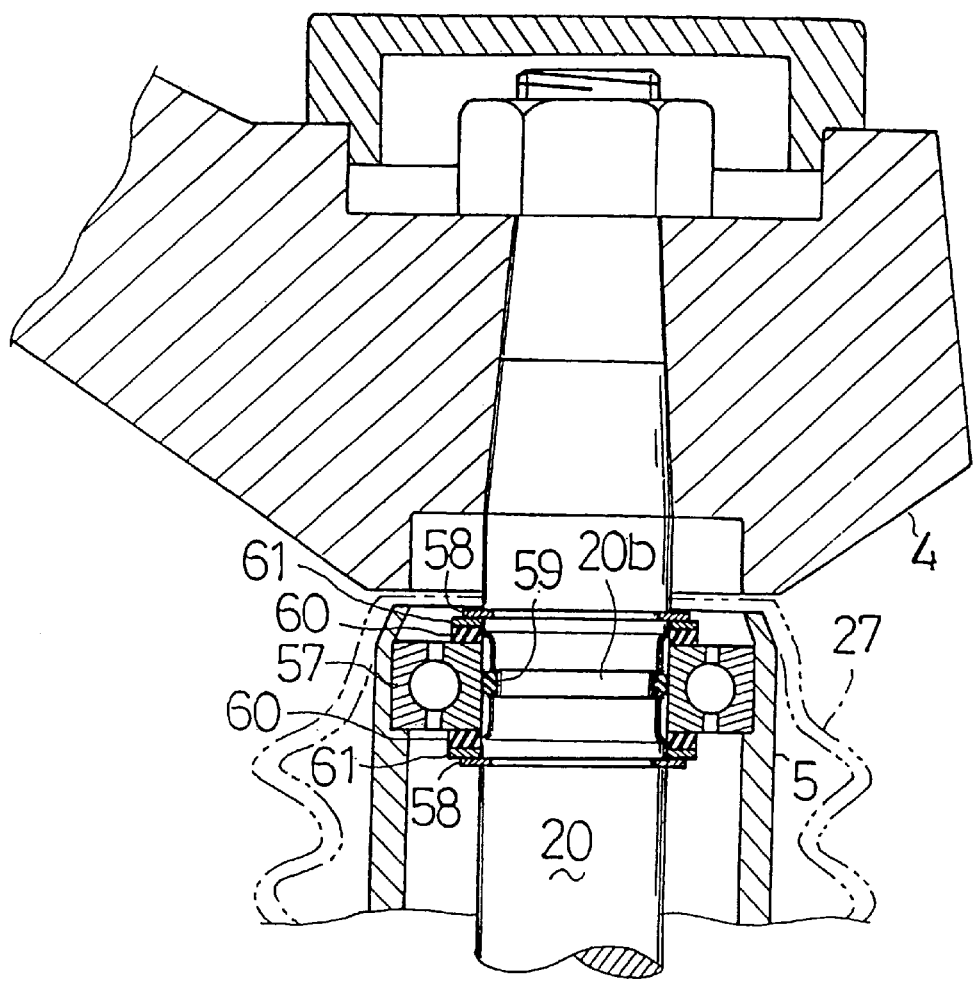
FIG. 11 is a sectional front view of the upper portion of steering column 5 rotatably supporting steering shaft 20, wherein steering column 5 is resistant to the diametric and axial vibrations of steering shaft 20.

As shown in FIG. 1, engine E is mounted on engine frame 1 and disposed in vehicle hood 2 on engine frame 1 in a front portion of a tractor. Dashboard 3 is disposed behind vehicle hood 2 and steering wheel 4 is disposed above dashboard 3. Steering wheel 4 is fixed onto the top end of steering shaft 20 as shown in FIGS. 9, 10 and 11. An upper portion of steering shaft 20 is rotatably supported by an upper portion of tubular steering column 5 through bearing 57. The upper portion of steering column 5 is fixed to support part 27 mounted on an upper surface of instrument panel 26 on dashboard 3. A bottom end of steering shaft 20 is connected to control shaft 21 of hydraulic control unit 16 and is fixed onto mounting plate 15 through coupling 25 as shown in FIG. 8. Mounting plate 15 and hydraulic control unit 16 are detailed below.

A seat 6 is disposed behind steering wheel 4. Transmission casing 7 which houses a speed changing device is disposed below seat 6. A power transmitting device consisting of a damper coupling, or occasionally a main clutch, is disposed between a power output shaft of engine E and a power input shaft of transmission casing 7. The damper coupling and transmitting shaft 29, which transmit power to the speed changing device through the damper coupling, are housed in frame H, disposed between a rear portion of engine E and a front portion of transmission casing 7. Frame H consists of engine mounting part 9, transmitting shaft covering part 8 and transmission casing mounting part 10, which are firmly attached to one another.

Front wheels 12, supported by a front axle casing (not shown) disposed under engine frame 1, are steered by power steering cylinder 13. Rear wheels 14 are supported by a rear axle casing (not shown) at both sides of transmission casing 7. Front and rear wheels 12 and 14 are driven by the power from engine E which is transmitted through the transmission in transmission casing 7. Mounting plate 15 is disposed over the joint between the front portion of transmitting shaft covering part 8 and the rear portion of engine mounting part 9, thereby reinforcing the joint.

Next, a construction of frame H and a mounting structure for mounting plate 15 on frame H will be described according to FIGS. 2 thru 7, 12 and others.

Figure 2:
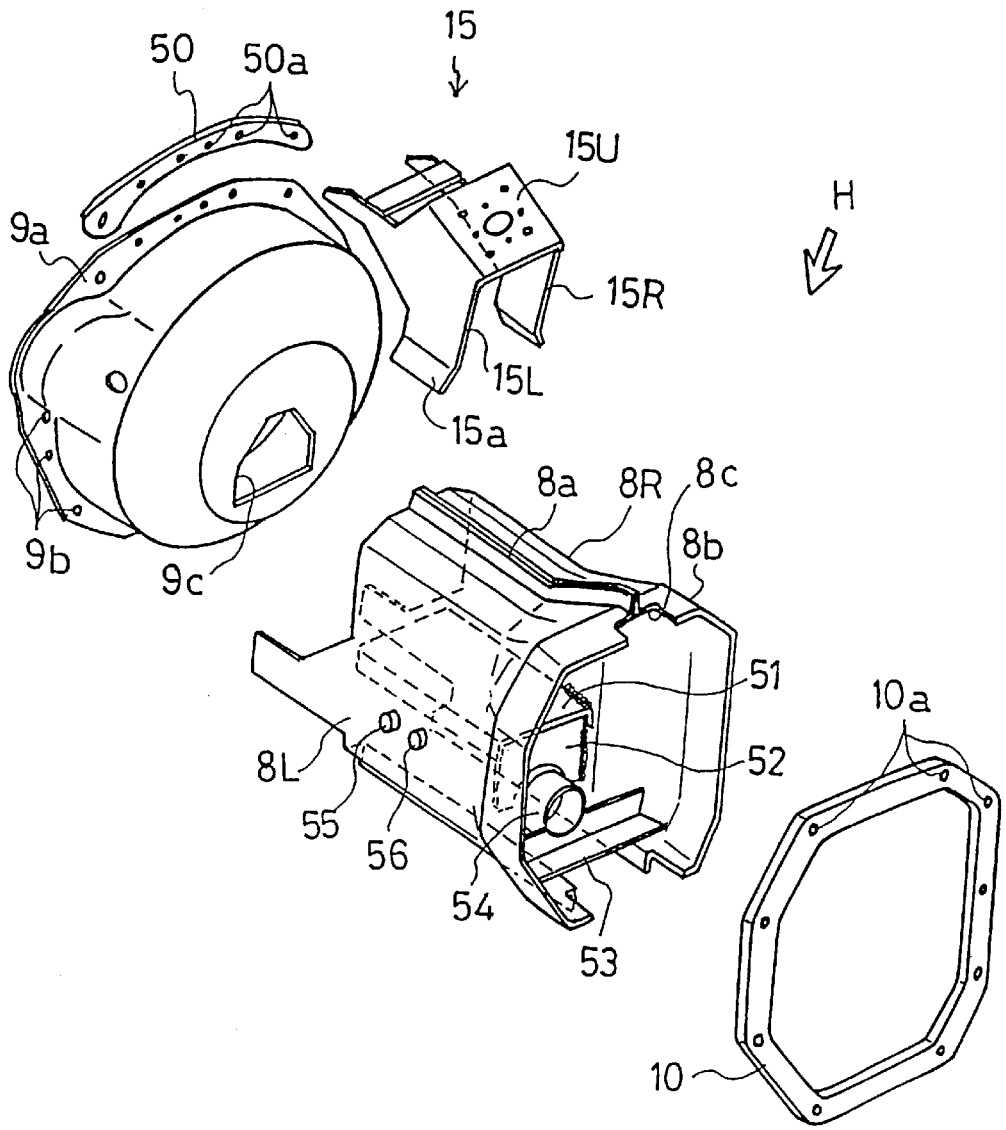
FIG. 2 is a perspective exploded view of frame H of the present invention.
Figure 3:
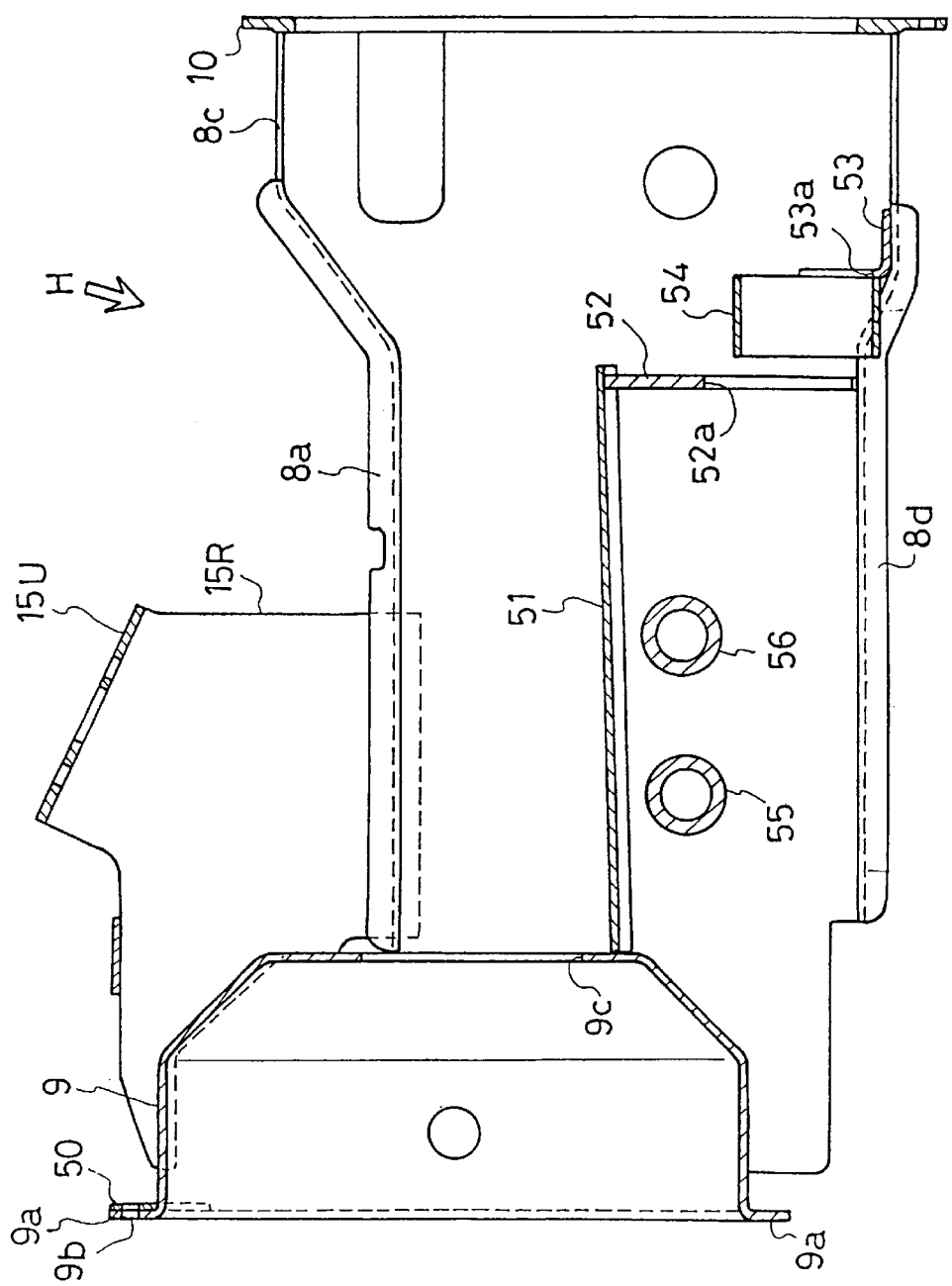
FIG. 3 is a sectional side view of frame H of the present invention.
Figure 4:
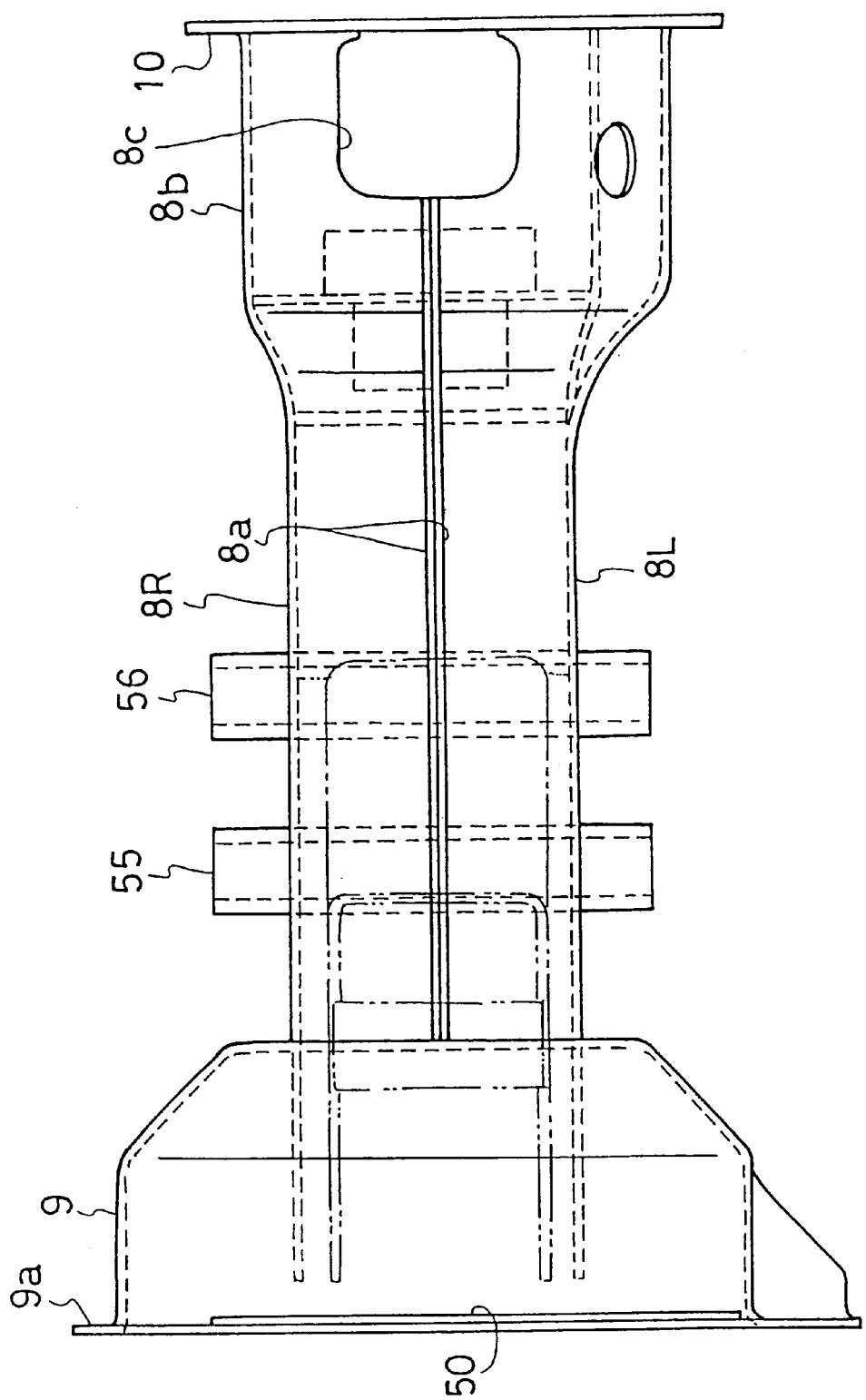
FIG. 4 is a plan view of frame H of the present invention.
Figure 5:
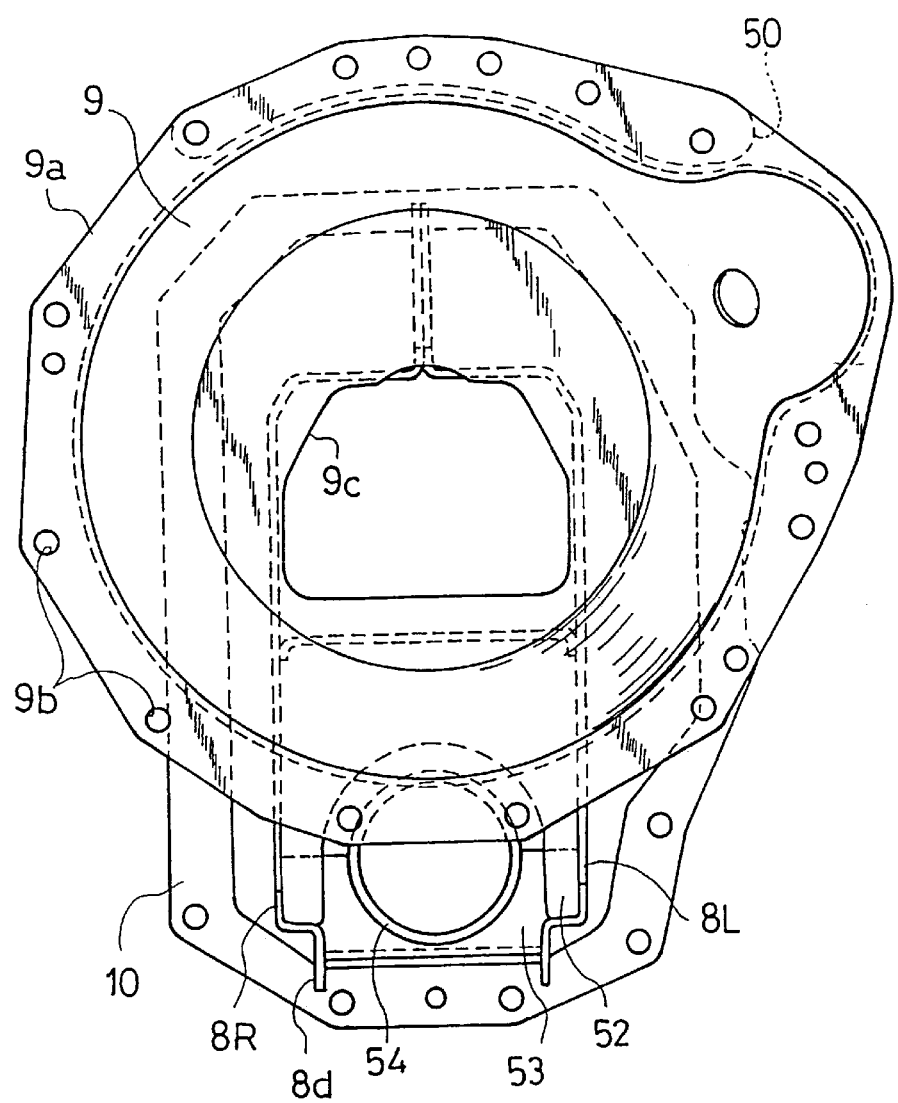
FIG. 5 is a front view of frame H of the present invention.
Figure 6:
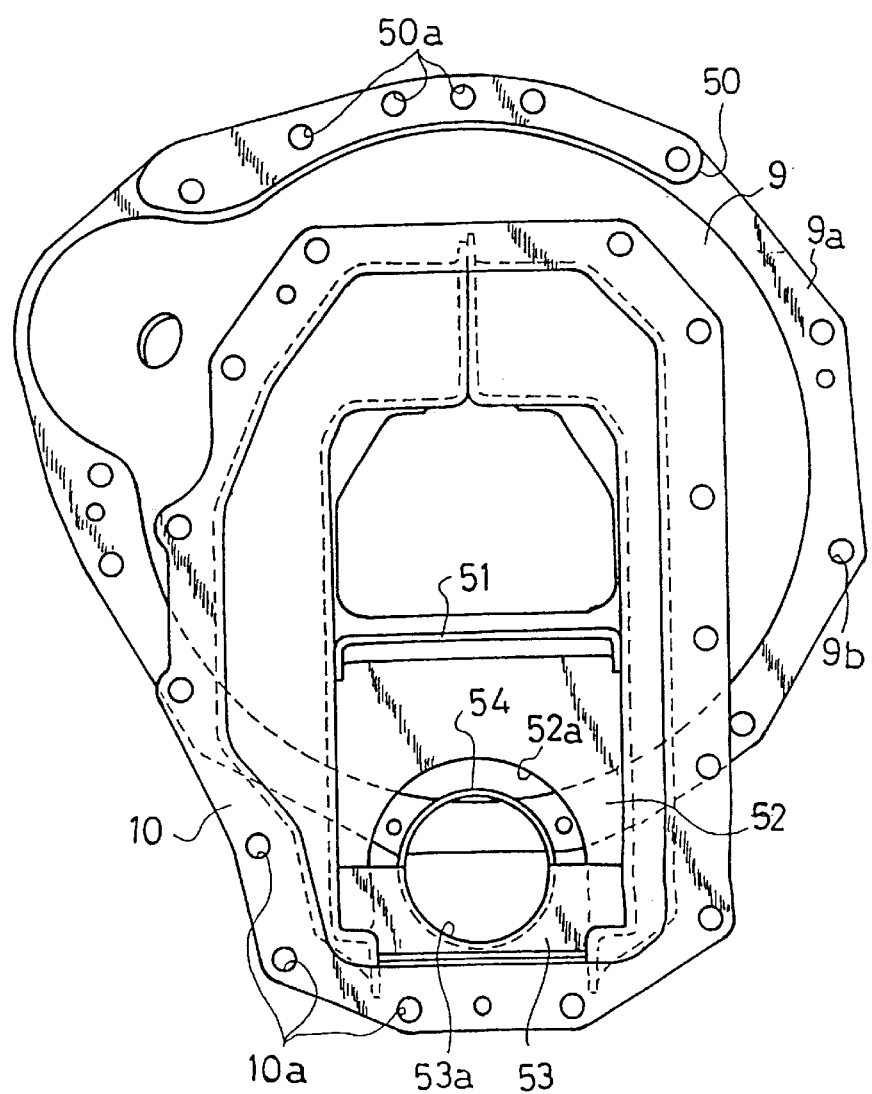
FIG. 6 is a rear view of frame H of the present invention.
Figure 7:
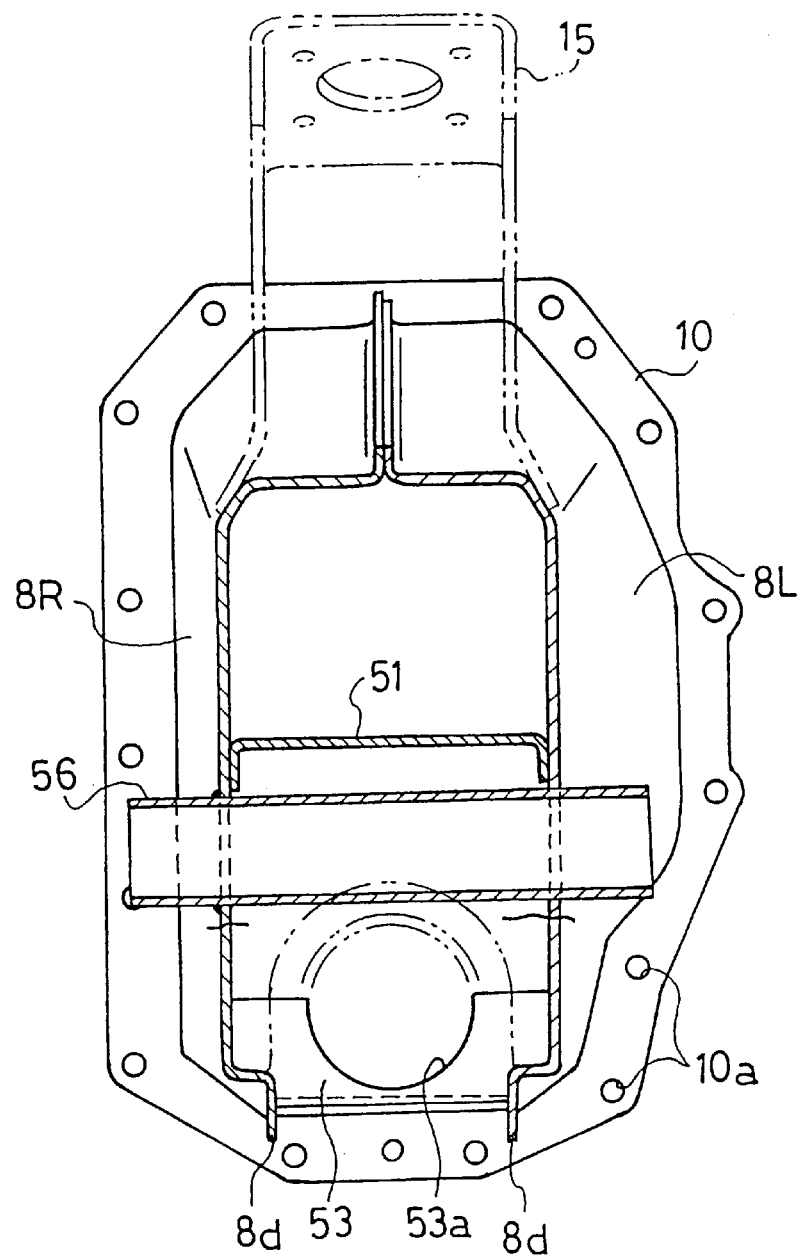
FIG. 7 is a sectional front view of frame H of the present invention.

As shown in FIGS. 2 and 3, mounting plate 15, which looks like an arch when viewed from the front, consists of upper plate portion 15U and leg plate portions 15L and 15R. Front end surfaces of leg plate portions 15L and 15R form extending portions 15La and 15Ra, extending along the direction of flange 9a so as to be able to attach to engine mounting part 9 along its external shape by welding or the like. Lower portions of leg plate portions 15L and 15R form skirt portions 15a which extend perpendicularly, outwardly and downwardly along the shape of the upper surface of transmitting shaft covering part 8 so as to fit thereto by welding or the like.

Accordingly, when leg plate portions 15L and 15R of mounting plate 15 are fixed onto the abutting portions of engine mounting part 9 and transmitting shaft covering part 8 by welding or the like, the three parts reinforce each other so as to strengthen the whole of frame H. Mounting plate 15 is fixed firmly onto frame H, so that hydraulic control unit 16, which is attached to the internal surface of mounting plate 15, and steering column 5 supporting steering shaft 20, which is attached to the external surface of mounting plate 15, are stably disposed.

Figure 12:
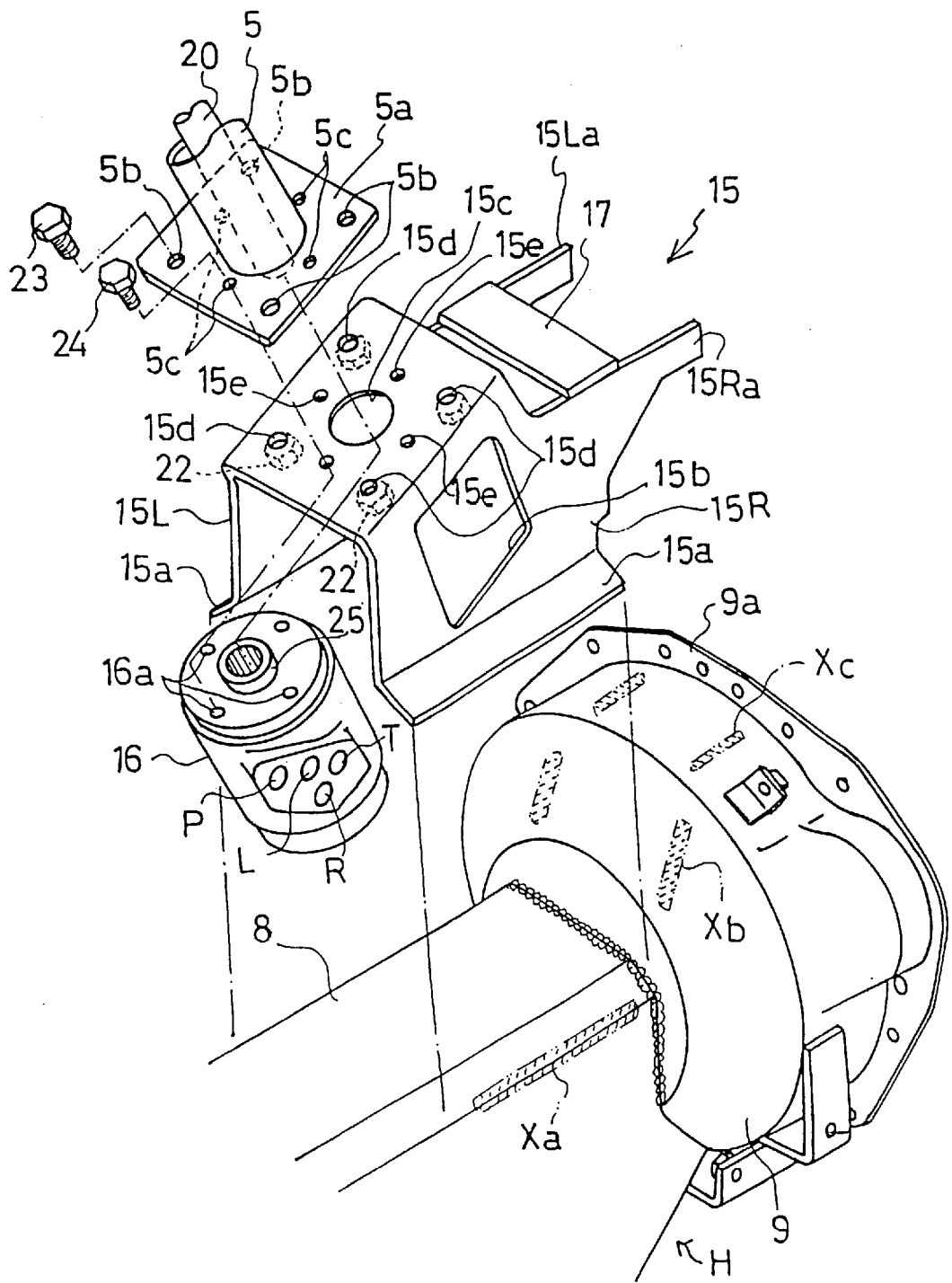
FIG. 12 is a perspective exploded view of steering column 5, mounting plate 15 and a changing apparatus mounted onto frame H.

Reference numerals Xa, Xb and Xc shown in FIG. 12 designate welding lines where engine mounting part 9 and transmitting shaft covering part 8 are welded to mounting plate 15. Reinforcing plate 17 is disposed between the front portions of leg plate portions 15L and 15R or is formed with mounting plate 15. When a front-loaded working vehicle works, flange 9a of engine mounting part 9, which is attached to engine E, is greatly stressed. Extending portions 15La and 15Ra of leg plate portions 15L and 15R of mounting plate 15 function as reinforcing ribs so as to ease the high-stress and prevent changes in engine mounting part 9.

Engine mounting part 9 is formed into a bowl for housing the damper coupling. An edge around the front opening of engine mounting part 9 is bent outwardly so as to form flange 9a. Threaded holes 9b are bored in flange 9a for bolting flange 9a together with engine E. A front surface of flange 9a is machined to be flat. Crescent-shaped reinforcing plate 50 is fitted onto an upper back surface of flange 9a. Threaded holes 50a are bored in reinforcing plate 50. Reinforcing plate 50, flange 9a and a mounting portion of engine E are bolted together so as to reinforce engine mounting part 9. An opening 9c is formed at the center of the rear surface of engine mounting part 9 for inserting transmitting shaft 29 therein. Transmitting shaft 29 connects the damper coupling with the power input shaft of the speed changing device.

Transmitting shaft covering part 8 is substantially laterally symmetrical and can be divided laterally along a vertical dividing line, or it may be divided vertically along a lateral dividing line into two parts 8L, 8R. Left half 8L and right half 8R are sheet metal processed so as to be inversely L-shaped when viewed from the rear. Each upper abutting portion of left and right halves 8L and 8R is bent upwardly so as to form edge portion 8a. Both edge portions 8a are fixed to each other by welding so as to form transmitting shaft covering portion 8 into an inversely U-shaped barrel when viewed from the rear. A front opening edge of transmitting shaft covering part 8 is firmly fixed to the rear surface of engine mounting part 9 by welding or the like. A rear portion of transmitting shaft covering part 8 is bent outwardly so as to form expanded portion 8b and a large space.

The rear end of expanded portion 8b is shaped to be able to attach to a front surface of transmission casing 7 and is fixed to transmission casing mounting part 10 by welding or the like. The fixing of transmitting shaft covering part 8 and transmission casing mounting part 10 by welding or the like and the shape of expanded portion 8b strengthen transmitting shaft covering part 8 and transmission casing mounting part 10. Transmission casing mounting part 10 forms a ring plate and has threaded holes 10a bored along its outer circumference, for fixing transmission casing mounting part 10 to transmission casing 7. The rear surface of transmission casing mounting part 10 is machined to be flat.

Each lower portion of left and right halves 8L and 8R is cranked so as to form an edge portion 8d, thereby strengthening itself. A first reinforcing member 51 is disposed between the vertical center portions of left and right halves 8L and 8R. First reinforcing member 51 is made of a plate having a length equal to the vertical center portion of left and right halves 8L and 8R measured between the front end of left and right halves 8L and 8R and the front end portion of expanded portion 8b. First reinforcing member 51 is bent downwardly at the left and right side ends thereof. The bent portions of first reinforcing member 51 are fixed onto the internal surfaces of left and right halves 8L and 8R by welding so as to firmly support transmitting shaft covering part 8 and to keep transmitting shaft covering part 8 in the shape of a barrel. Transmitting shaft 29 passes longitudinally through a space above first reinforcing member 51 within transmitting shaft covering part 8.

A second reinforcing member 52 is made of a plate and is fixed to a lower surface of a rear end of reinforcing member 51 and to the internal side surfaces of left and right halves 8L and 8R. A half circular notch 52a is formed at the center of the lower portion of reinforcing member 52. A third reinforcing member 53 is disposed between the internal side surfaces of left and right halves 8L and 8R in expanded portion 8b. Third reinforcing member 53 is L-shaped when viewed from the side. A half circular notch 53a opening at an upper end thereof is formed at the center of a vertical surface of third reinforcing member 53. A pipe 54 having the same diameter as that of notch 53a projects frontwardly from notch 53a. Transmitting shaft 18, shown in FIG. 1, passes through pipe 54 for transmitting power to front wheels 12. The rear end of transmitting shaft 18 is connected with a front wheel driving PTO shaft projecting from the front surface of transmission casing 7 through a joint. The front end of transmitting shaft 18 passes between edge portions 8d of left and right halves 8L and 8R and extends out of frame H so as to be joined to the power input shaft of the front axle casing supporting front wheels 12.

A pair of support pipes 55 and 56 disposed in a longitudinal row and in parallel to each other pass laterally through both left and right halves 8L and 8R. Support pipe 55 supports a support shaft of a master brake pedal. Support pipe 56 supports the support shafts of the left and right steering brake pedals.

An opening portion 8c is formed at an upper rear surface of left and right halves 8L and 8R, so that a relief valve of a charge pump disposed on the front end of transmission casing 7, a relief valve of an HST included in the transmission, or the like can be regulated through opening portion 8c.

A frame structure according to the present invention, comprising frame H and mounting plate 15 brings the following advantages:

Since frame H, integrally joining transmission casing 7 to an engine E, consists of three sheet metal members, engine mounting part 9, transmitting shaft covering part 8 and transmission casing mounting part 10, it can be less expensive with respect to molds and raw materials than a molded frame, it can be lighter and its production time can be reduced.

Since transmitting shaft covering part 8 is formed into a barrel by means of joining vertically divided halves or laterally divided halves with each other, it can have increased strength. Also, since the edges of the front and rear ends of both halves are fixed to engine mounting part 9 and transmission casing covering part 10, accuracy of the end surfaces abutting against engine E and transmission casing 7 can be obtained, so as to firmly join with them.

Also, since reinforcing members 51, 52 and 53 are disposed below transmitting shaft 29 between laterally divided left and right halves 8L and 8R of transmitting shaft covering part 8, both halves can be firmly joined with each other by reinforcing members 51, 52 and 53. Reinforcing members 51, 52 and 53 do not project outwardly and thus are prevented from colliding with other assemblies. The space above reinforcing members 51, 52 and 53 can be used for passing through transmitting shaft 29, thus an opening for a power takeoff shaft is not required to be disposed at the lower surface of transmitting shaft covering part 8 and transmitting shaft 29 can be disposed without weakening the strength of transmitting shaft covering part 8. Also, the reinforcing members can prevent muddy water from penetrating into the interior of frame H.

Since engine mounting part 9 is entirely formed in the shape of a bowl, it has increased strength. Additionally, an end surface of each of left and right halves 8L and 8R of transmitting shaft covering part 8 is fixed to the external wall of the bottom portion of the bowl shape, so that transmitting shaft covering part 8 and engine mounting part 9 can be reinforced by each other. Furthermore, since mounting plate 15 supporting the steering unit is laid over the external wall of the bowl shape and over each of the left and right halves 8L and 8R of transmitting shaft covering part 8, transmitting shaft covering part 8 and engine mounting part 9 can be more firmly reinforced by each other.

Also, since the edge of the opening of engine mounting part 9 is bent outwardly so as to form flange 9a for fixing to engine E, the circumference of engine mounting part 9 can be additionally reinforced and engine mounting part 9 can be more accurately attached to engine E. Furthermore, since reinforcing plate 50 is fixed onto the back surface of flange 9a, flange 9a can be provided with sufficient strength to counteract the straining stress on the attaching portion.

Also, since transmission casing mounting part 10 is made of sheet metal formed into a substantially similar shape as the front surface of transmission casing 7, transmitting casing mounting part 10 can be more accurately attached to transmission casing 7. Furthermore, since the other end of transmitting shaft covering part 8 is formed into expanded portion 8b, the transmitting shaft covering part 8 can be strengthened because of the curved surface of expanded portion 8b. Also, the opening end of expanded portion 8b is fixed to transmission casing mounting part 10, so that transmitting shaft covering part 8 and transmitting casing mounting part 10 are reinforced by each other.

Next, a construction for mounting plate 15, mounted on frame H, and a supporting construction for a steering unit near mounting plate 15 will be described according FIGS. 8 thru 15.

Upper plate portion 15U of mounting plate 15 on frame H slants downwardly and backwardly, corresponding to the mounting angle of steering shaft 20. A through hole 15c is open at the center of upper plate portion 15U for connecting steering shaft 20 with control shaft 21 of hydraulic control unit 16. A plurality of bolt insert holes 15d and 15e are bored around hole 15c for mounting steering column 5 and hydraulic control unit 16.

Flange 5a, which looks square in plan view, is integrally formed at a bottom end of steering column 5. Bolt insert holes 5b are open at the four corners of flange 5a corresponding to the positions of bolt insert holes 15d of upper plate portion 15U. Nuts 22 are welded to the lower surface of upper plate portion 15U at the positions of bolt insert holes 15d. Flange 5a is mounted on the upper surface of upper plate portion 15U through bolts 23.

Bolt insert holes 5c are bored in flange 5a corresponding to bolt insert holes 15e of upper plate portion 15U. Threaded holes 16a are also open at an upper surface of hydraulic control unit 16 corresponding to bolt insert holes 15e. Accordingly, when flange 5a is mounted on upper plate portion 15U, threaded holes 16a are positioned on bolt insert holes 15e, and flange 5a, upper plate portion 15U and hydraulic control unit 16 are screwed together by bolts 24.

Hydraulic control unit 16 is a changing apparatus of a control valve type, which changes the rotational movement of the steering wheel 4 into the steering movement of front wheels 12 through power steering cylinder 13, which is a double-acting hydraulic cylinder. The hydraulic circuit of hydraulic control unit 16 is described below.

Figure 13:
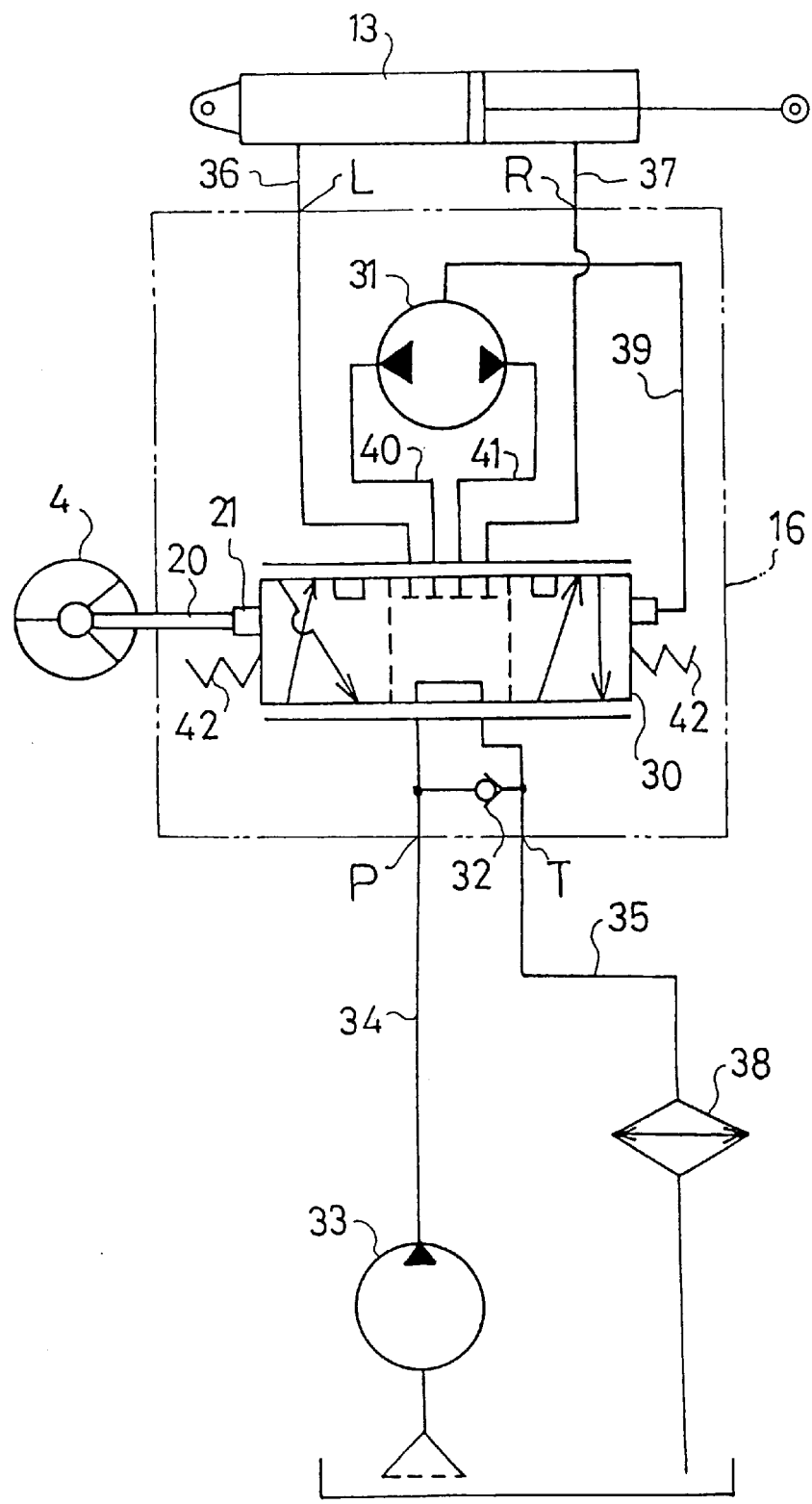
FIG. 13 is a hydraulic circuit diagram for power steering cylinder 13.

As shown in FIG. 13, hydraulic control unit 16 consists of rotary switching valve 30, metering pump 31 and check valve 32, which are united. Switching valve 30, which has six ports and can be shifted to three positions, is provided with control shaft 20. Pump port P is open at an external surface of hydraulic control unit 16 and is connected with hydraulic pump 33 through conduit 34, as shown in FIG. 8. Tank port T is open at the external surface of hydraulic control unit 16 and is connected with a sump through conduit 35 and oil cooler 38. Check valve 32 is interposed between pump port P and tank port T.

Output ports L and R are open at the external surface of hydraulic control unit 16 and are connected with power steering cylinder 13 through conduits 36 and 37. The other output ports 40 and 41 are connected with the suction and discharge ports of metering pump 31. Switching valve 30, which is biased toward its neutral position by springs 42, can be shifted to left and right operating positions according to control shaft 21. A feedback system 39 of metering pump 31 is connected with switching valve 30 and is disposed opposite to control shaft 21. Opening 15b is bored at one of leg plate portions 15L and 15R. Each coupling on the ends of conduits 34, 35, 36 and 37 is connected respectively with ports P, T, L and R.

In such a construction, when steering wheel 4 is rotationally operated, control shaft 21 is rotated through steering shaft 20 and coupling 25. Corresponding to this rotation, switching valve 30 is shifted from its neutral position to its left or right operating position. Pressurized oil discharged from hydraulic pump 33 passes through metering pump 31 and is charged into one of the fluid chambers of power steering cylinder 13, so as to move its piston rod outwards or inwards. As a result, knuckle arms connected with the piston rod of power steering cylinder 13 (not shown) are rotated so as to steer front wheels 12. The degree of rotation of meter pump 31 is transmitted to switching valve 30 through feedback system 39, so that switching valve 30 returns to its neutral position. Thus, power steering cylinder 13 is lengthened or shortened in proportion to the degree of rotation of steering wheel 4 and is held after being lengthened or shortened, so that the steering angle of front wheels 12 is maintained.

Figure 14:
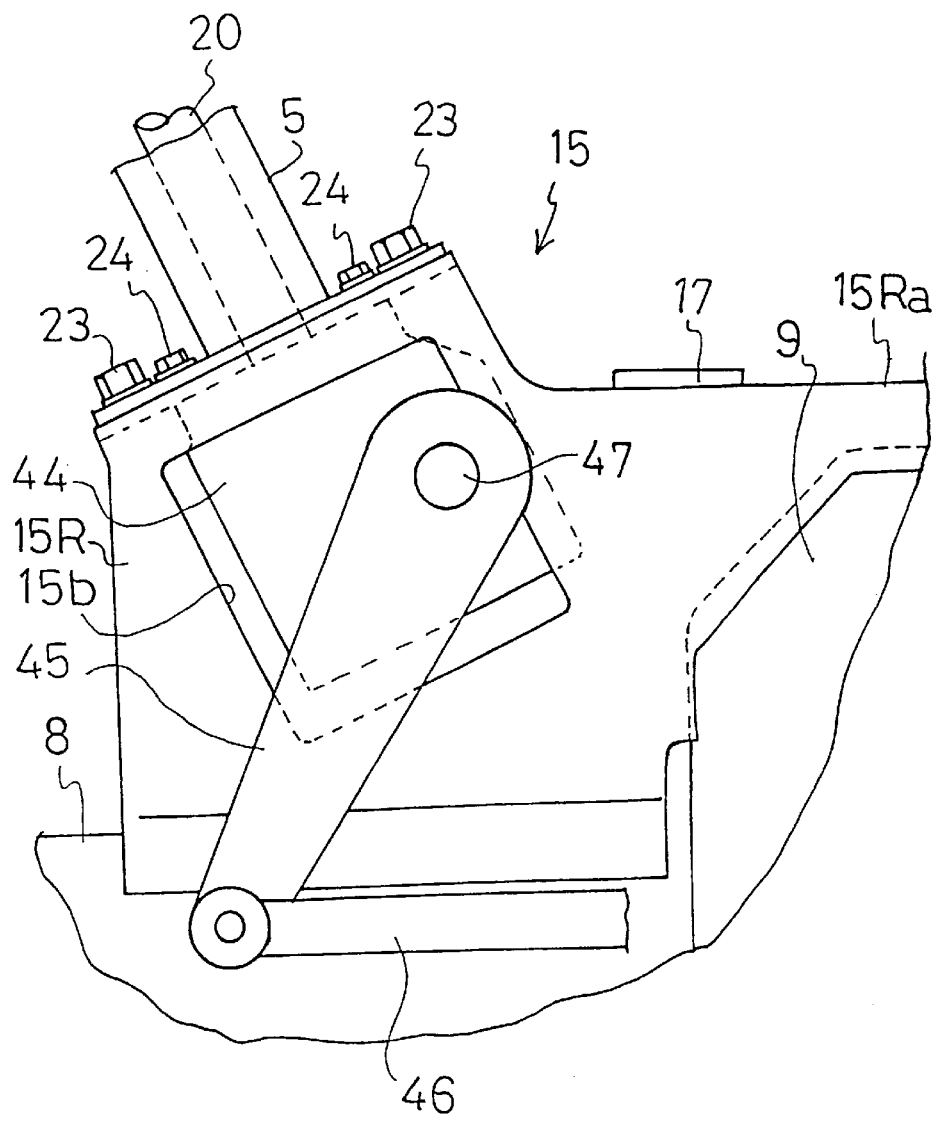
FIG. 14 is a side view of the base portion of steering column 5 attached to mounting plate 15 by another manner.
Figure 15:
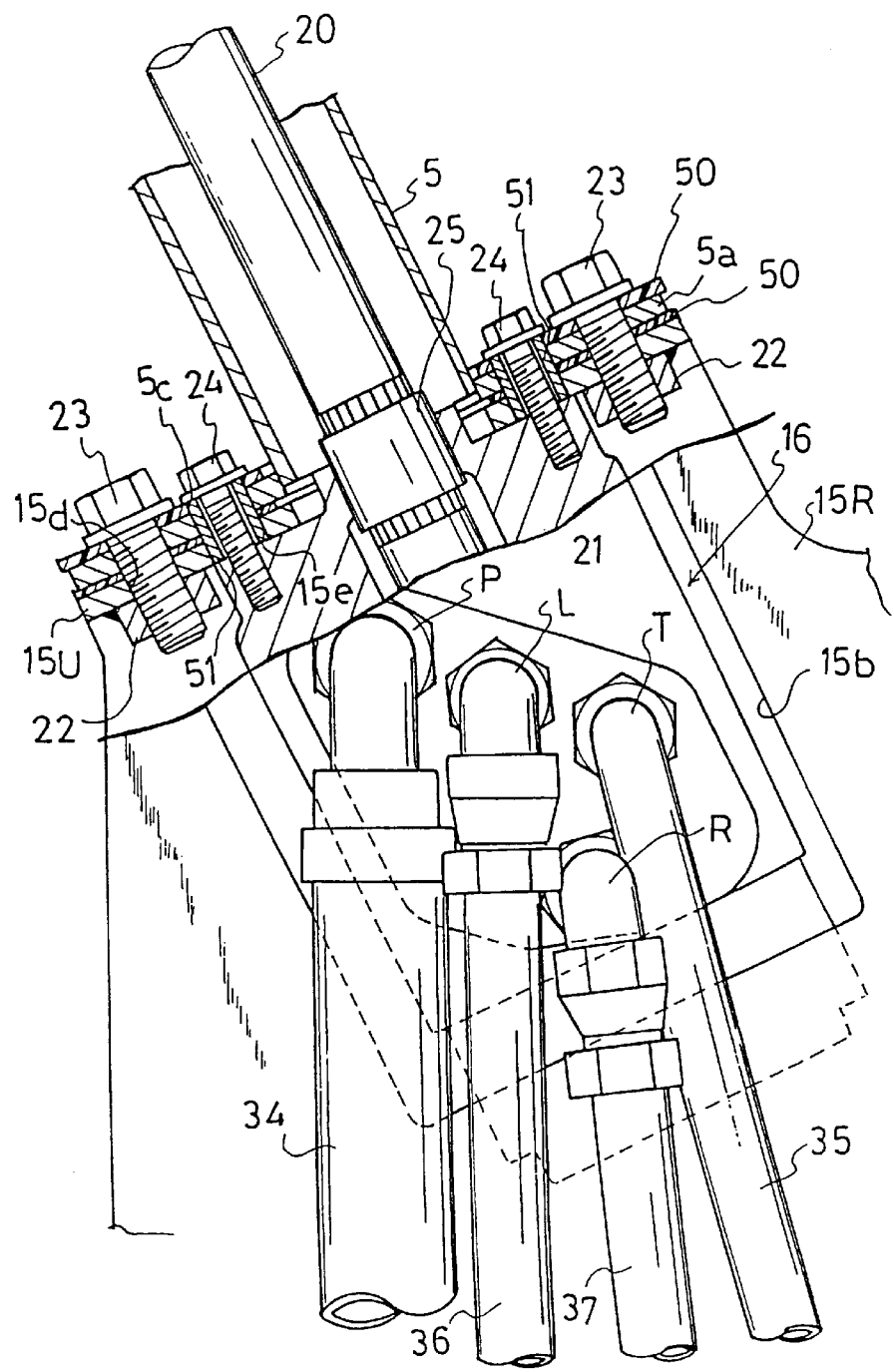
FIG. 15 is a sectional side view of the base portion of steering column 5 attached to mounting plate 15 with vibration-resistance.

As shown in FIG. 14, a mechanical changing apparatus such as gearbox 44 may take the place of hydraulic control unit 16 as the changing apparatus and may be attached to the lower surface of upper plate portion 15U of mounting plate 15. In this case, steering shaft 20 is connected with an input shaft of gearbox 44 (not shown). Gearbox 44 houses a worm gearing, bevel gears and the like. Output shaft 47 of gearbox 44 projects from opening 15b of leg plate portion 15R. Pitman arm 45 is fixed onto the projected end of output shaft 47. One end of link 46 is connected to pitman arm 45 and the other end is connected to the knuckle arms (not shown) of front wheels 12. Thus, the rotational movement of steering wheel 4 can be mechanically changed into the steering movement of front wheels 12.

The oscillation of engine E is propagated from frame H to mounting plate 15 so as to vibrate steering wheel 4 through steering shaft 20. If the vibration is uncomfortable, it can be avoided by use of the vibration-resistance system shown in FIG. 15. The vibration-resistance system is constructed so that elastic plates 50 made of rubber or the like are spread between the upper surface of upper plate portion 15U and the lower surface of flange 5a and between the upper surface of flange 5a and the heads of bolts 23 and 24. Bolts 24, which screw together hydraulic control unit 16 and mounting plate 15, are inserted into a collar 51. Bolt insert holes 5c and 15e are expanded so as to hold collar 51 therein and flange 5a and elastic plates 50 are fixed to upper plate portion 15U through collars 51.

The construction of mounting plate 15, mounted on frame H, according to the present invention and the supporting construction for a changing apparatus near mounting plate 15 according to the present invention bring the following advantages:

Arched mounting plate 15 has increased strength due to its shape, so as to reinforce frame H. Also, the shape of mounting plate 15 allows a changing apparatus, such as hydraulic control unit 16, to be supported by mounting plate 15 without a supporting member in an inner space thereof, and allows steering column 5 together with its own base portion to be firmly supported by the upper surface of mounting plate 15.

Also, since flange 5a, formed on the base portion of steering column 5, is screwed together with the housing of a changing apparatus such as hydraulic control unit 16 through mounting plate 15, bolts can be screwed downwardly into the changing apparatus so as to ease the attachment of the changing apparatus. Furthermore, since flange 5a can be expanded so as to increase the clamping positions and contact area thereof, the attached base portion of steering column 5 can be clamped to the changing apparatus more firmly and have sufficient strength against forces applied to steering wheel 4.

Embodiments for supporting an upper portion of steering shaft 20 by steering column 5 for damping effect will be described according to FIGS. 9 thru 11.

Conventionally, steering shaft 20 is supported by a bearing 57 in steering column 5 as shown in FIG. 9. According to the embodiment shown in FIG. 10, a portion 20a of steering shaft 20, disposed between retaining rings 58, is formed so that an outer surface thereof is separated from the inner surface of bearing 57. Portion 20a may have a shorter diameter than that of the other portions of steering shaft 20. A circular groove 20b is formed on the outer surface of portion 20a. A dumper ring 59 is engaged into circular groove 20b so as to be disposed between steering shaft 20 and the inner surface of bearing 57. Dumper ring 59 has such elasticity as to allow steering shaft 20 to move in all diametric directions against dumper ring 59, so that steering column 5 can be resistant to the diametric vibration of steering shaft 20.

According to a second embodiment shown in FIG. 11, the following is added to the construction shown in FIG. 10. Retaining rings 58 are separated from the upper and lower surfaces of bearing 57. Rubber collar 60 and washer 61 are closely disposed between retaining rings 58 and each of the upper and lower surfaces of bearing 57. Rubber collar 60 abuts against bearing 57 and steering shaft 20 so as to absorb upward and downward movement of bearing 57. Accordingly, steering column 5 can be allowed to move axially against bearing 57, so that steering column 5 can be resistant to the axial vibration of steering shaft 20 in addition to the resistance to the diametric vibration of steering shaft 20 discussed above.

Next, an embodiment of a covering system for housing engine E and the like of a working vehicle will be described according to FIGS. 16 thru 23.

Figure 16:
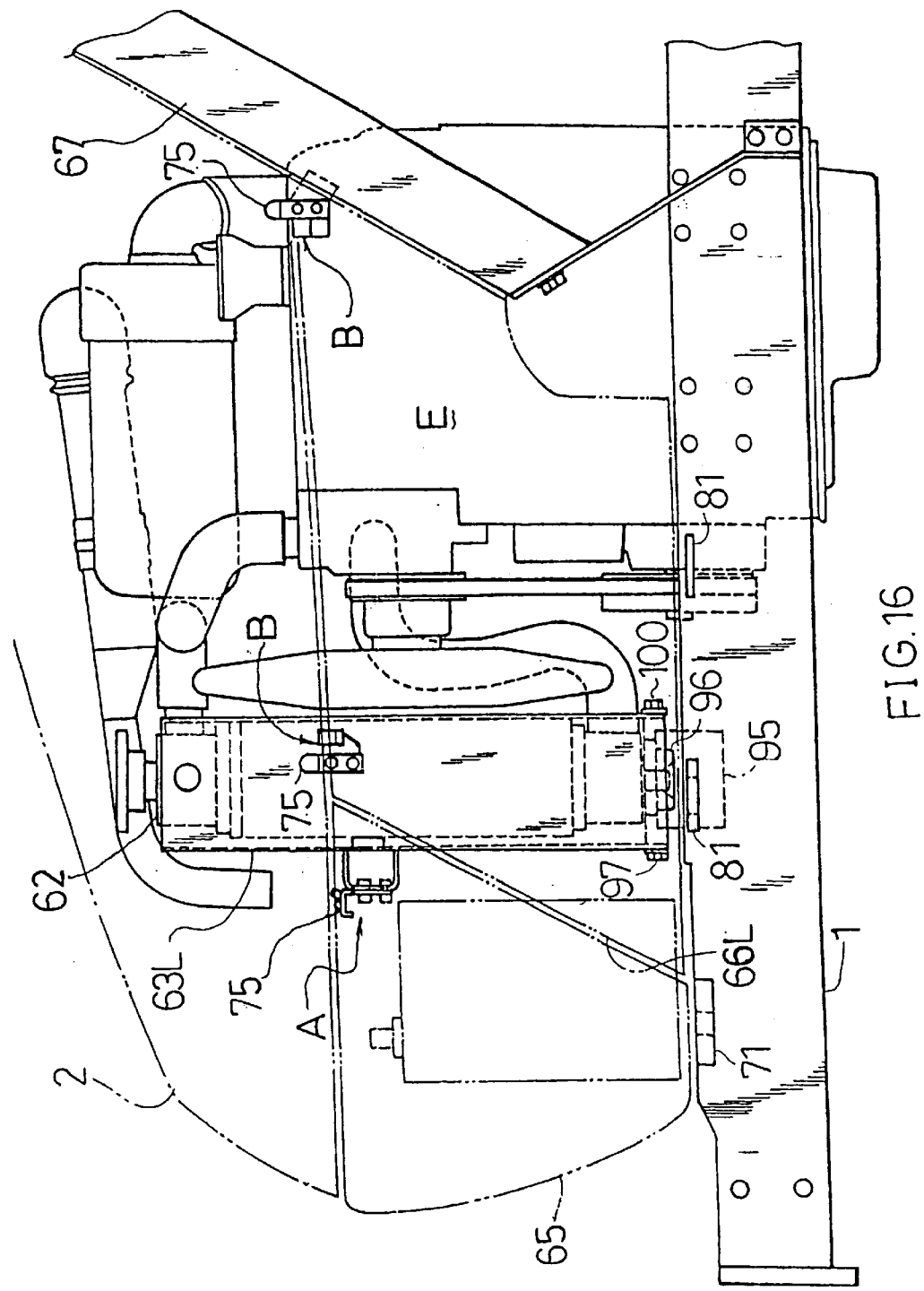
FIG. 16 is a side view of an engine E and radiator 62 disposed on engine frames 1.
Figure 17:
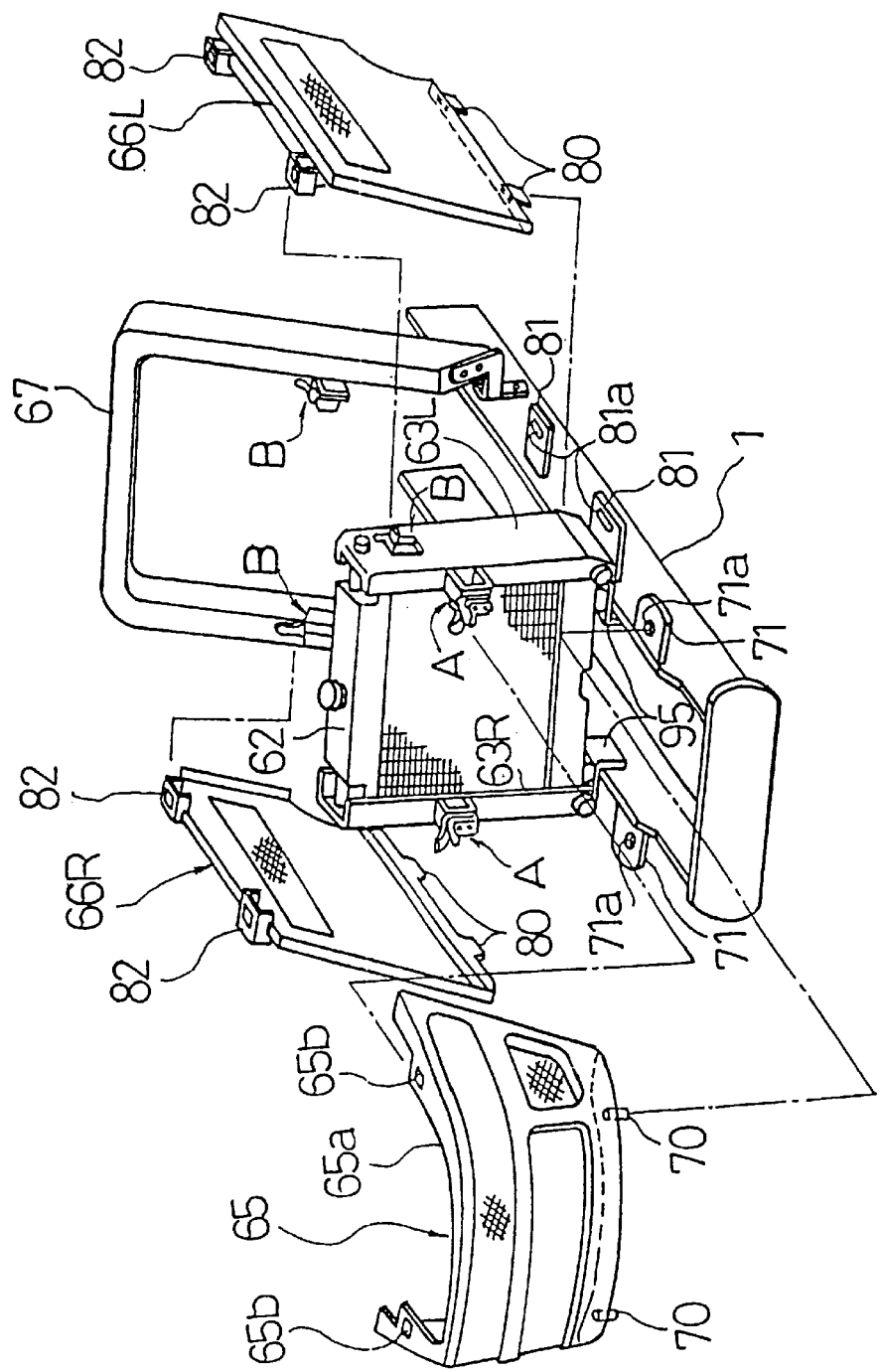
FIG. 17 is an exploded view in perspective of a radiator 62 and a pair of radiator support frames 63L and 63R at the front portion of the working vehicle when hood covers are removed.

As shown in FIGS. 16 and 17, radiator 62 is mounted in front of engine E on engine frame 1. Radiator 62 is fixed to a pair of radiator support frames 63L and 63R. A battery (not shown) is disposed in front of radiator 62 and a fuel tank (not shown) is disposed behind engine E. All of these are covered by vehicle hood 2 from above, front cover 65 at the front, and side covers 66L and 66R at the sides. Front cover 64 is made of synthetic resin for reduced weight and cost. Side covers 66L and 66R are processed sheet metal. The rear portion of vehicle hood 2 is pivotally attached to the upper portion of arched frame 67. Dashboard 3 is disposed behind vehicle hood 2.

Figure 18:
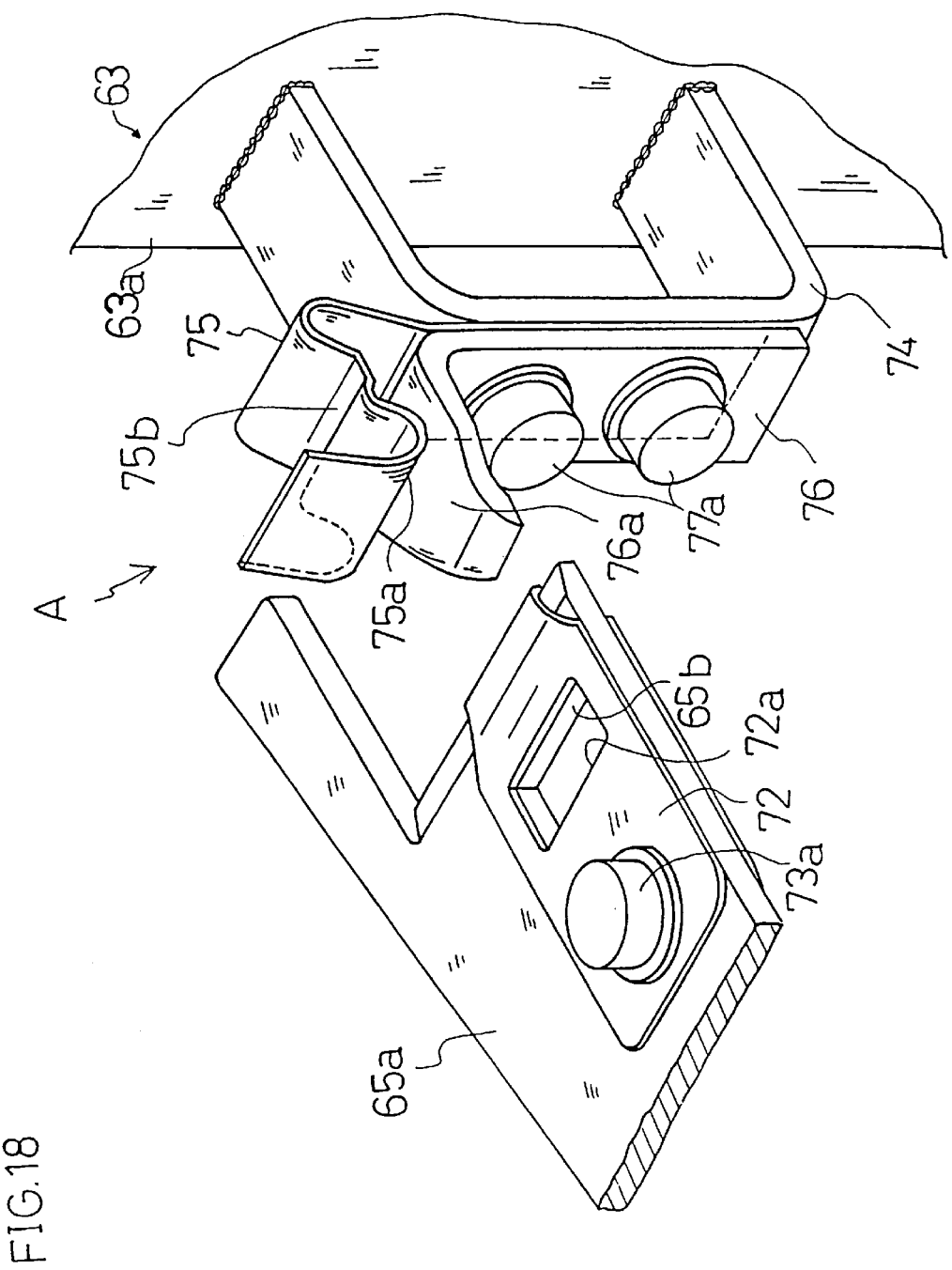
FIG. 18 is a perspective view of a right removable attachment portion of front cover 65.
Figure 19:
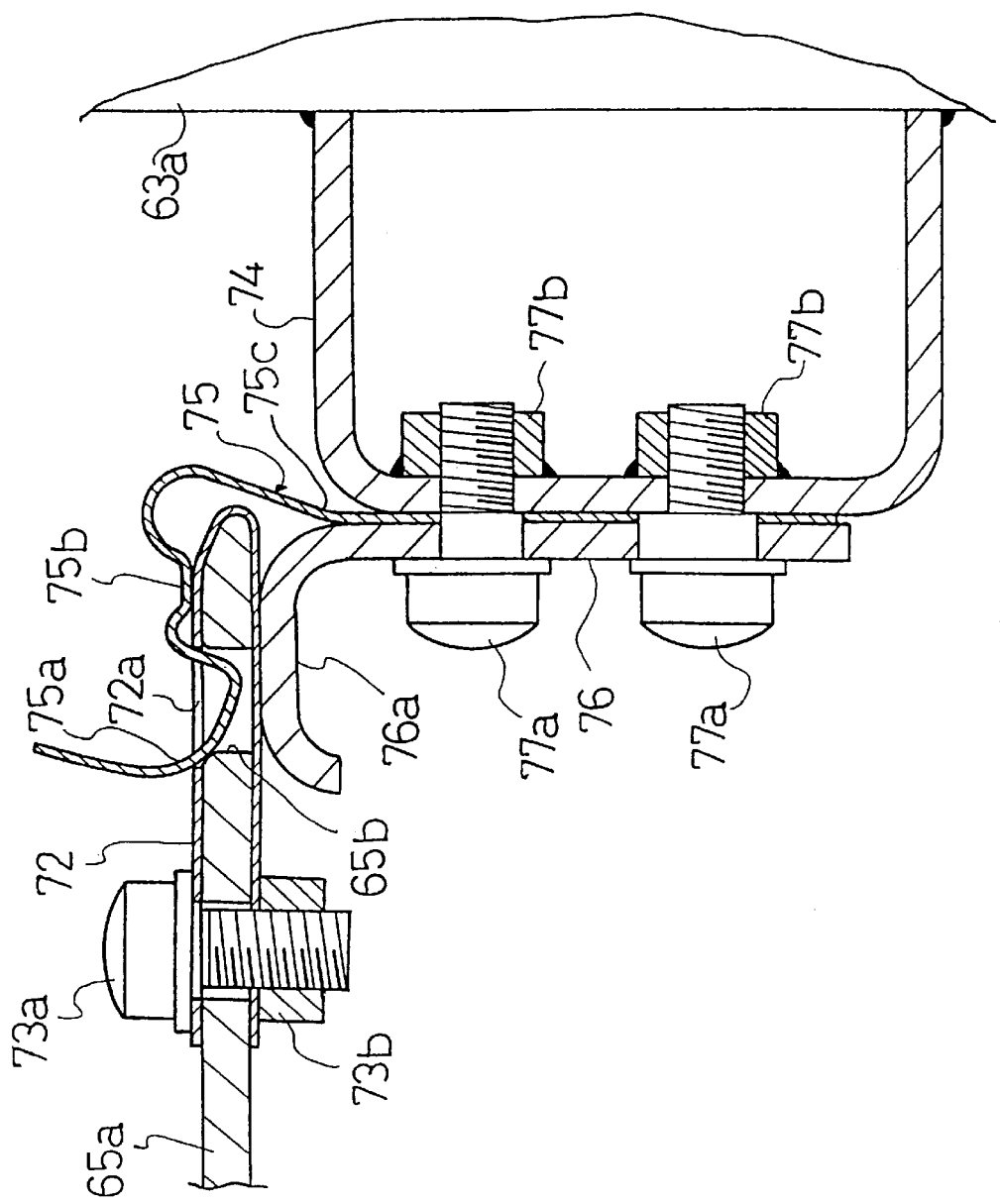
FIG. 19 is a sectional side view of the same.

A system for mounting removable front cover 65 as shown in FIGS. 16 and 17 is described below. Engagement projections 70 project downwardly from left and right portions of the bottom edge of front cover 65. Stays 71 project outwardly from each of the left and right sides of engine frame 1 and are pierced by engagement holes 71a, corresponding to engagement projections 70, so that engagement projections 70 can be inserted into engagement holes 71a. The left and right portions of top edge 65a of front cover 65 are pierced by engagement holes 65b. Both the upper and lower surfaces of top edge 65a surrounding engagement holes 65b are covered with U-shaped bent metal protector 72, as shown in FIGS. 18 and 19, which is pierced by engagement hole 72a corresponding to the position and shape of engagement hole 65b. Metal protectors 72 are attached to top edge 65a through bolt 73a and nut 73b.

Engaging members A are disposed on front surface 63a of radiator support frames 63L and 63R for attaching with front cover 65 through engagement holes 65b. Engaging members A are constructed so that both leg portions of U-shaped support plate 74 are fixed onto front surface 63a by welding and leaf spring 75 and support plate 76 are fixed onto the front surface of support plate 74 through bolts 77a and nuts 77b. Leaf spring 75, which is substantially inversely L-shaped, has a width corresponding to that of engagement hole 65b. Bolt holes are bored through a lower portion of leaf spring 75, and a curved portion 75a is formed above longitudinally intermediate portion 75c of leaf spring 75, as shown in FIGS. 18 and 19. Curved portion 75a is substantially U-shaped, larger than engagement hole 65b, and positioned so as to be inserted into engagement hole 65b. A base portion of curved portion 75a is formed as horizontal portion 75b so as to receive the upper surface of top edge 65a near engagement hole 65b. A free end of curved portion 75a extends upwardly so that it can be inserted easily into engagement hole 65b. Leaf spring 75 can be bent upwardly like a fulcrum at intermediate portion 75c, when pushed by a finger.

Support plate 76 is substantially inversely L-shaped. Bolt holes are bored through a lower portion thereof so as to fix leaf spring 75 to support plate 74 through bolts 77a and nuts 77b. An upper horizontal portion of support plate 76 is formed as receiving portion 76a and is positioned under curved portion 75a. Top edge 65a of front cover 65 is caught between receiving portion 76a and curved portion 75a. A portion toward the free end of curved portion 75a is bent downwardly for guiding top edge 65a as it is inserted between receiving portion 76a and curved portion 75a. The shape of support plate 74 is not restricted. It can be L-shaped or box-shaped. Also, leaf spring 75 and support plate 76 can be attached to front surface 63a of radiator support frames 63L and 63R directly without support plate 74. Leaf spring 75 and support plate 76 may be fixed by welding, for example, however, the above embodiment utilizes bolts 77a and nuts 77b because they can be easily positioned after attachment of leaf spring 75.

Next, attachment of removable side covers 66L and 66R will be described, as shown in FIG. 17 and FIGS. 20 thru 23. Engagement projections 80 project from the bottom edge of side covers 66L and 66R. Stays 81 project rightwardly and leftwardly from the center and rear portions of engine frame 1. Stays 81 are pierced by engagement holes 81a, so that engagement projections 80 can be positioned and inserted into engagement holes 81a. Engagement members 82 are fixed by welding to the front and rear portions of top edge 66a of side covers 66L and 66R. Engagement members 82 are made of sheet metal bent at the utmost end and the lateral ends. An engagement hole 82a is open at the center of engagement member 82. Engagement hole 82a is the same square shape and size as engagement hole 65b so that leaf springs 75 can be used with both.

Figure 20:
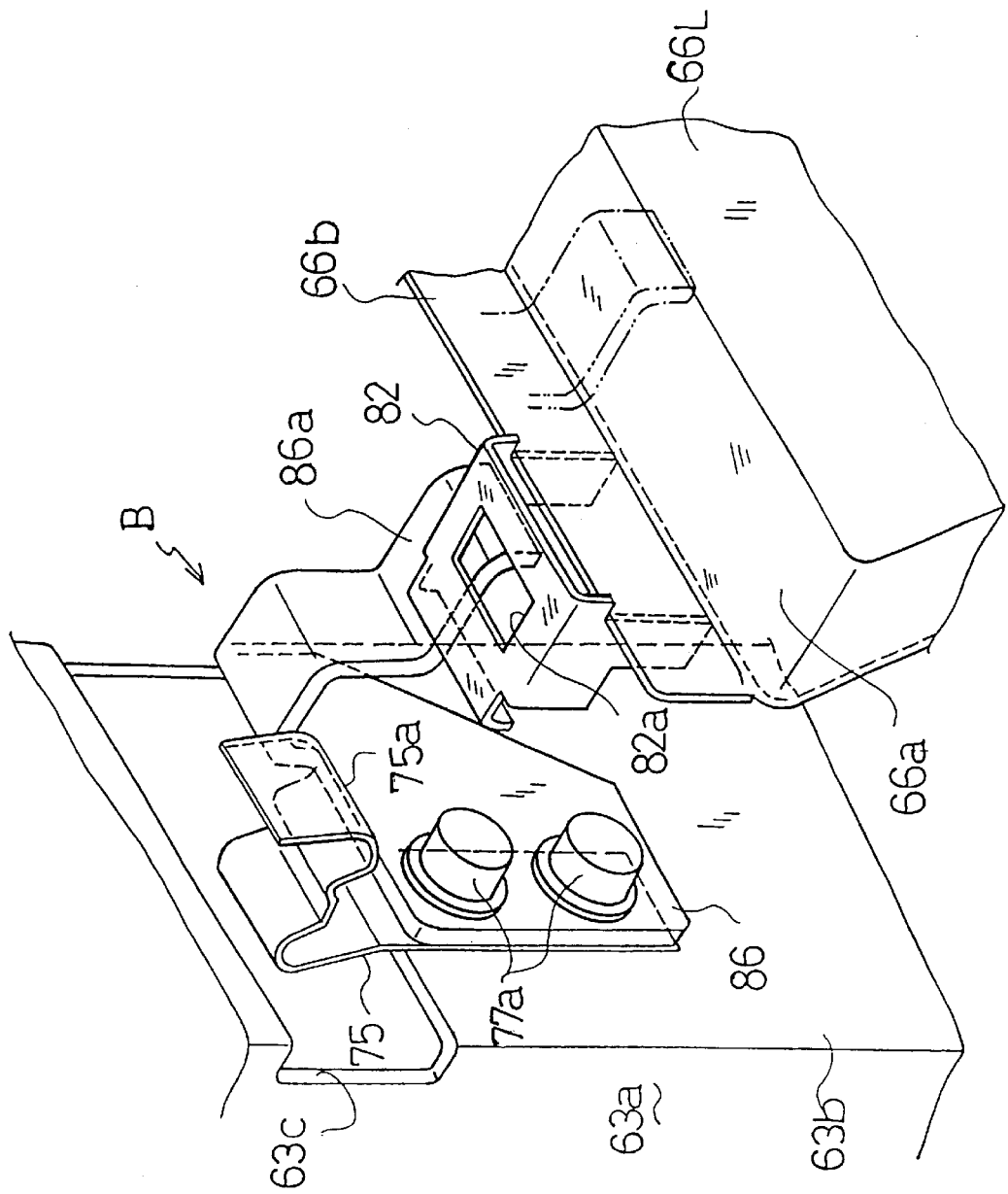
FIG. 20 is a perspective view of a front removable attachment portion of side cover 66L.
Figure 21:
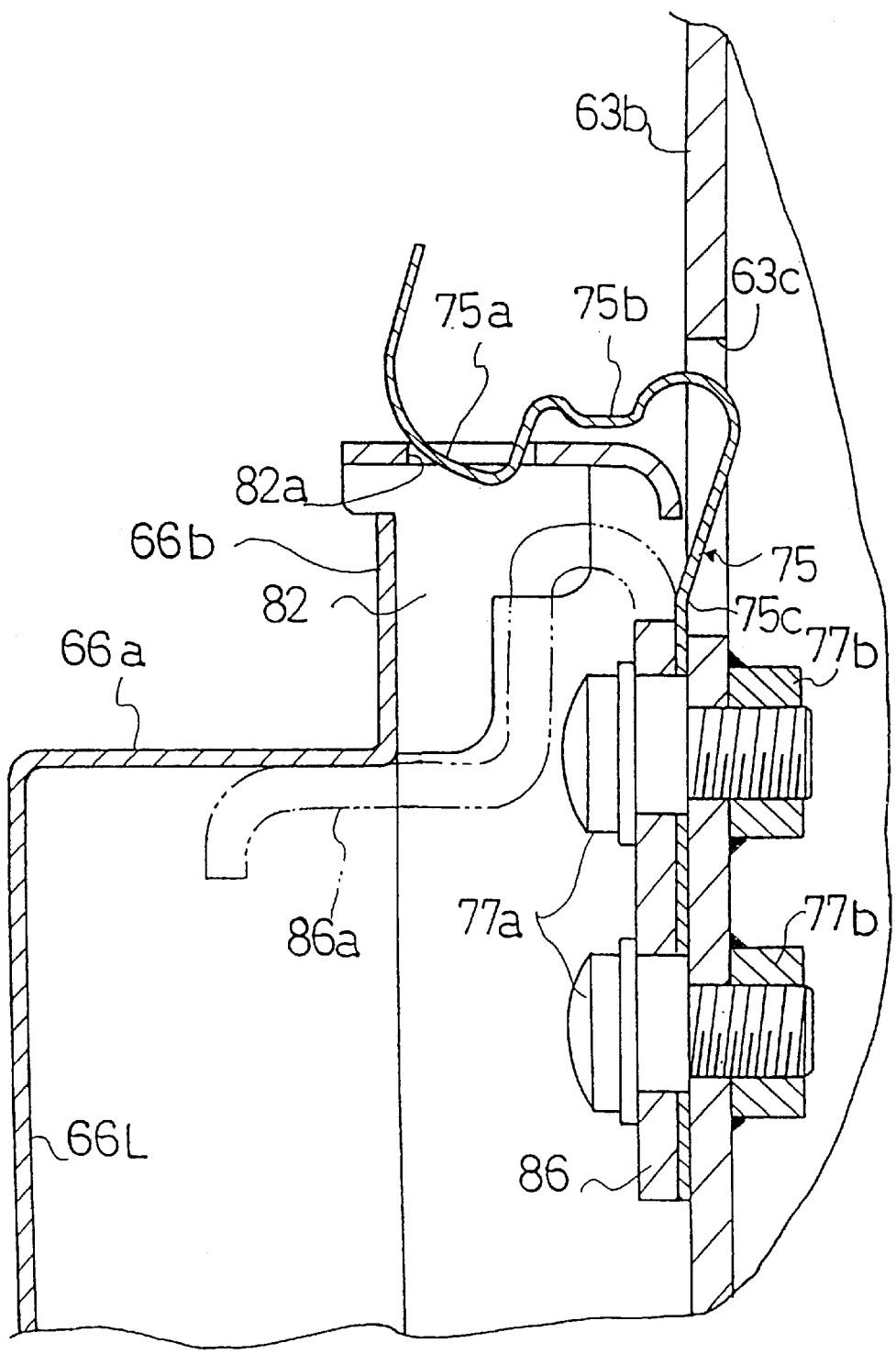
FIG. 21 is a sectional front view of the same.

Engaging members B for attaching side covers 66L and 66R, which are inserted into engagement holes 82a of engagement members 82, are attached to radiator support frames 63L and 63R and arched frame 67. As shown in FIGS. 20 and 21, each of front engaging members B is constructed so that leaf spring 75 and support plate 86 are fixed onto an outer side surface 63b of radiator support frames 63L and 63R through bolts 77a and nuts 77b. Outer side surface 63b has an opening 63c so as to prevent outer side surface 63b from abutting against leaf spring 75 when curved portion 75a is bent upwardly. Support plate 86 looks like a trapezoid when viewed from the side and has a receiving portion 86a projecting horizontally and sidewardly from the portion of support plate 86 to the rear of leaf spring 75. A receiving portion 86a is bent stepwardly corresponding to the height of the lower surface of horizontal top edge 66a of side covers 66L and 66R.

Figure 22:
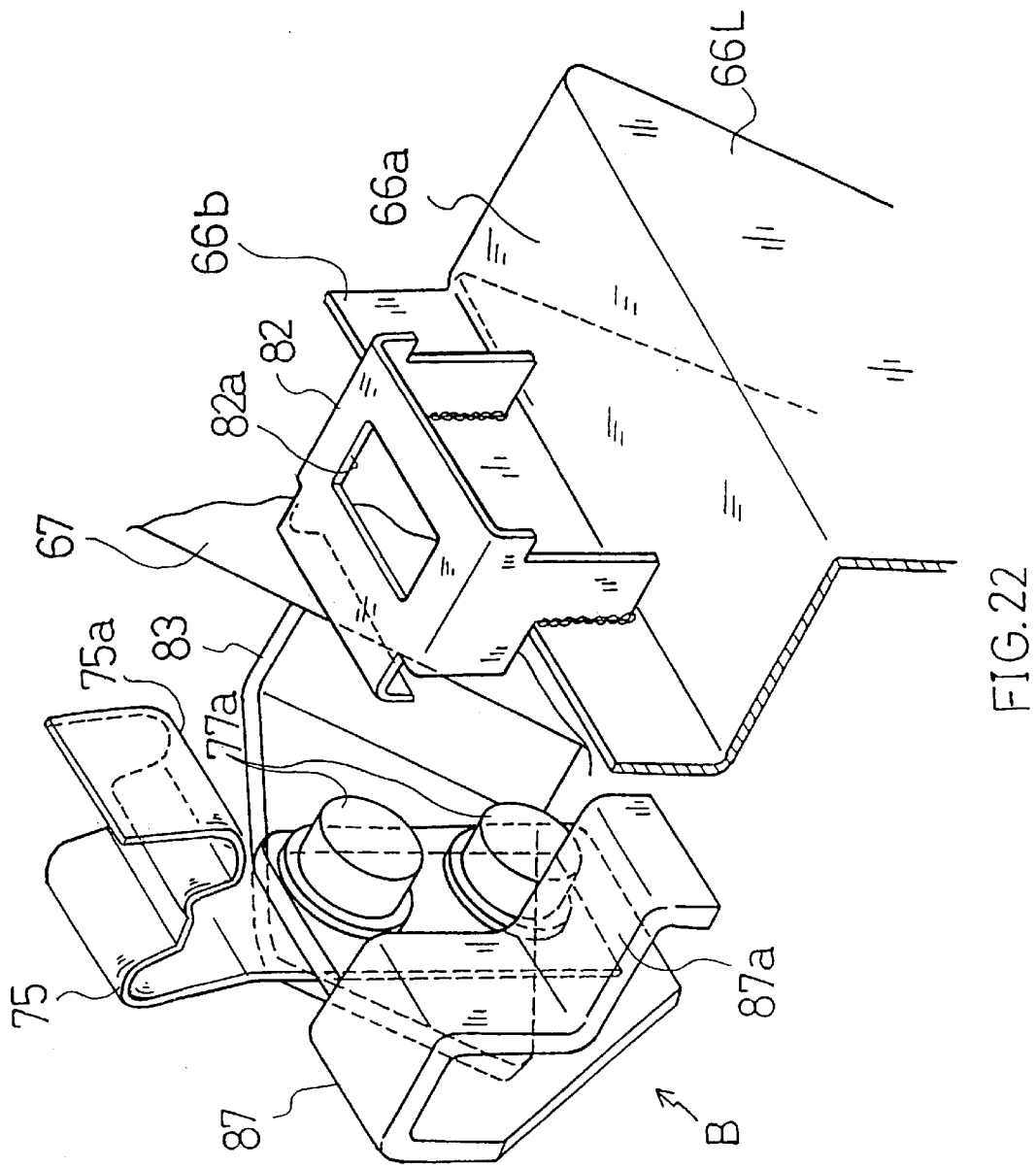
FIG. 22 is a perspective view of a rear removable attachment portion of side cover 66L.
Figure 23:
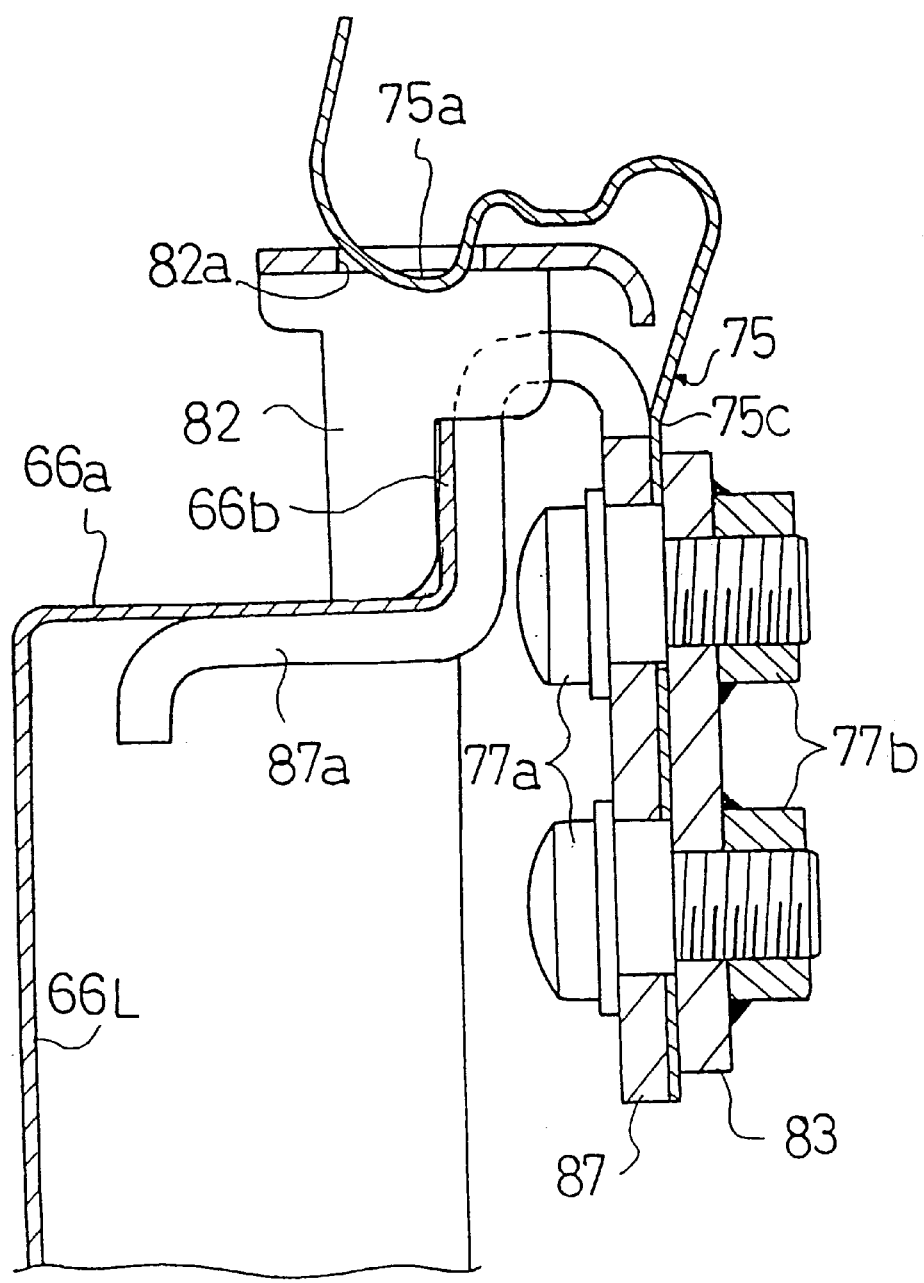
FIG. 23 is a sectional front view of the same.

As shown in FIGS. 22 and 23, each of rear engaging members B is constructed so that the base portion of support plate 83 is welded onto the inner side surfaces of arched frame 67. A free end portion of support plate 83 is bent frontwardly, so that leaf spring 75 and support plate 87 are fixed together onto the outer side surface of the free end portion of support plate 83 through bolts 77a and nuts 77b. Support plate 87 is disposed laterally symmetrically against support plate 83 and has a receiving portion 87a disposed in front of leaf spring 75. The bolt holes of leaf springs 75 and support plates 76, 86 and 87 are formed as vertically long ovals so as to allow the heights of curved portions 75a and receiving portion 76a to be adjusted.

According to the constructions described above, when front cover 65 is attached to the working vehicle body, engagement projections 70 are inserted into engagement holes 71a of stays 71 of engine frame 1. Then, the upper portion of front cover 65 is pushed rearwardly, so that top edge 65a is inserted between leaf spring 75 and support plate 76, whereby curved portions 75a of leaf spring 75 are inserted into engagement holes 65b of top plate 65a. Thus, front cover 65 is able to be engaged with the working vehicle body quickly. When engaged, the inner front and rear edges of engagement holes 65b abut against the front and rear portions of curved portions 75a. Also, the width of curved portion 75a is sized to engagement hole 65b, so that the lateral ends of curved portions 75a abut against the inner side edges of engagement holes 65b. Thus, front cover 65 is prevented from shaking longitudinally and laterally. Furthermore, the lower surface of top edge 65a is received by receiving portion 76a of support plate 76, so as to prevent front cover 65 from shaking vertically.

To remove front cover 65, top edge 65a is pulled forwardly, allowing curved portions 75a of leaf spring 75 to be bent upwardly, so as to remove curved portions 75a from engagement holes 65b. Then, front cover 65 is lifted, allowing engagement projections 70 to be removed from engagement holes 71a, so that front cover 65 can be removed. By covering top edge 65a of synthetic resin front cover 65 with metal protector 72, friction between top edge 65a and curved portion 75a can be reduced, so that front cover 65 can be longer lasting. Side covers 66L and 66R can be attached and removed in a similar manner.

The attachment of a covering system according to the present invention brings the following advantages:

Providing radiator support frames 63L and 63R and arched frame 67, which are mounted on engine frame 1, with attachment means such as engaging members A and B, which comprise leaf springs 75 having curved portions 75a capable of being be elastically inserted into engagement holes pierced in engagement members provided on front cover 65 and side covers 66L and 66R perpendicular to the direction of attachment and removal of the covers, allows the covers to be quickly attached to the attachment means and easily removed. Furthermore, when the covers are attached to the attachment means, the engaging members are engaged with the engagement holes, so that the cover can be stabilized without shaking.

Also, when each curved portion 75a of leaf spring 75 is inserted into an engagement hole, the lateral ends of curved portion 75a, which are substantially perpendicular to the attachment and removal of the covers, abut against the inner edges of the engagement hole, thereby tightly engaging curved portion 75a with the engagement hole, allowing the covers to be positioned easily.

Also, since front cover 65 is made of synthetic resin and top edge 65a is integrally molded together with front cover 65, the shape and design of front cover 65 can be simplified. Furthermore, since top edge 65a is covered with a metal member such as metal protector 72, which has an opening substantially as large as engagement hole 65a, front cover 65 can be protected against abrasion, even if it is attached and removed repeatedly for a long time. Thus, front cover 65 can be long lasting.

Also, since side covers 66L and 66R are provided with engagement members 82 and radiator support frames 63L and 63R and arched frame 67 are provided with support plates 86 and 87, which receive the elastic forces of leaf spring 75 when curved portion 75a of leaf spring 75 is inserted into engagement hole 86a and 87a, the elastic force of leaf spring 75 is retained stably instead of being influenced by the elasticity of side covers 66L and 66R. Thus, side covers 66L and 66R can be held more stably.

Next, a support system where radiator 62 is supported by a pair of radiator support frames 63L and 63R is described in accordance with FIGS. 16, 17, 24, 25 and 26.

A pair of brackets 62b are fixed onto the left and right side surfaces of upper portion 62a of radiator 62. A nut 90 is welded onto the inner surface of each of brackets 62b, so that bolt 98 can be screwed into fixing nut 90 at an upper portion of radiator support frames 63L and 63R. A pair of engagement projections 62d integrally project from the left and right sides of the bottom surface of lower portion 62c of radiator 62. Lower portion 62c is made of synthetic resin.

A pair of stays 95 are fixed onto the upper portion of a longitudinal intermediate portion of engine frame 1. An intermediate portion of each of stays 95 is bent right and left outwardly so as to be inversely L-shaped when viewed from the front. The vertical portion of stay 95 is fixed onto engine frame 1, and the horizontal portion of stay 95 forms base seat 95a. Mounting member 96, for elastically supporting radiator 62, is engaged with base seat 95a. An engagement hole 96a having a vertical axis is bored in base seat 95a. The pair of engagement projections 62d of radiator 62 are inserted into engagement holes 96a of mounting members 96, so that the bottom of lower portion 62c of radiator 62 mounted on the pair of mounting members 96 is positioned and fixed thereto. Mounting members 96 are made of an elastic member such as rubber or synthetic resin so as to protect radiator 62 against vibration. In this embodiment, mounting member 96 is fixed through base seat 95a, however, it may alternatively be fixed on an upper surface of base seat 95a.

The outside end of stays 95 is curved so as to form a tubular portion 95b. Radiator support frames 63L and 63R are U-shaped in plan view and the lower portion thereof slants inwardly corresponding to the shape of lower portion 62b. Mounting portion 63a projects from the lower end of radiator support frames 63L and 63R and engagement hole 63b is bored therein. Engagement holes 63b are positioned coincidently with tubular portions 95b. Bolt 97 is inserted into engagement hole 63b and tubular portion 95b. An end of bolt 97 is screwed into nut 100. Thus, the lower end of radiator support frames 63L and 63R are pivotally attached to the outside ends of stays 95, so as to form a hinge, which can be rotated around bolt 97. A portion of radiator support frames 63L and 63R above mounting portion 63a extends in a straight line so as to engage with the sides of radiator 62.

Bolts 98 are disposed at an upper portion of each of left and right radiator support frames 63L and 63R. When the pair of radiator support frames 63L and 63R are erected, left and right bolts 98 are disposed with their inner ends turned toward each other. A collar 99 projects from the inner surface of the opening at the upper portion of each of radiator support frames 63L and 63R. When radiator 62 is assembled, collars 99 guide bolts 98 as they are inserted therethrough and screwed into nut 90 on the upper portion of radiator 62.

Figure 24:
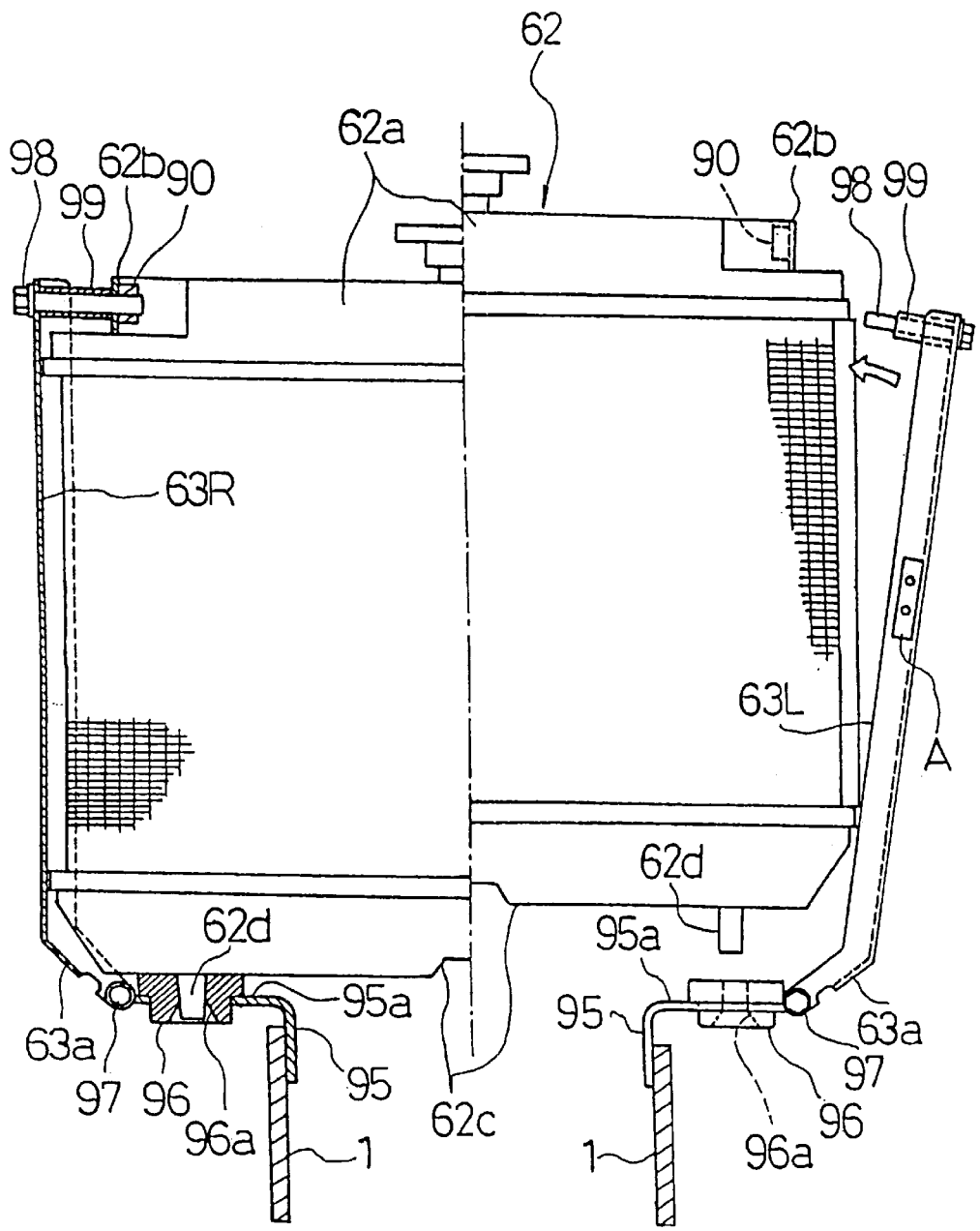
FIG. 24 is a front view of radiator 62 including a right half view before assembling and a left half view after assembling.
Figure 25:
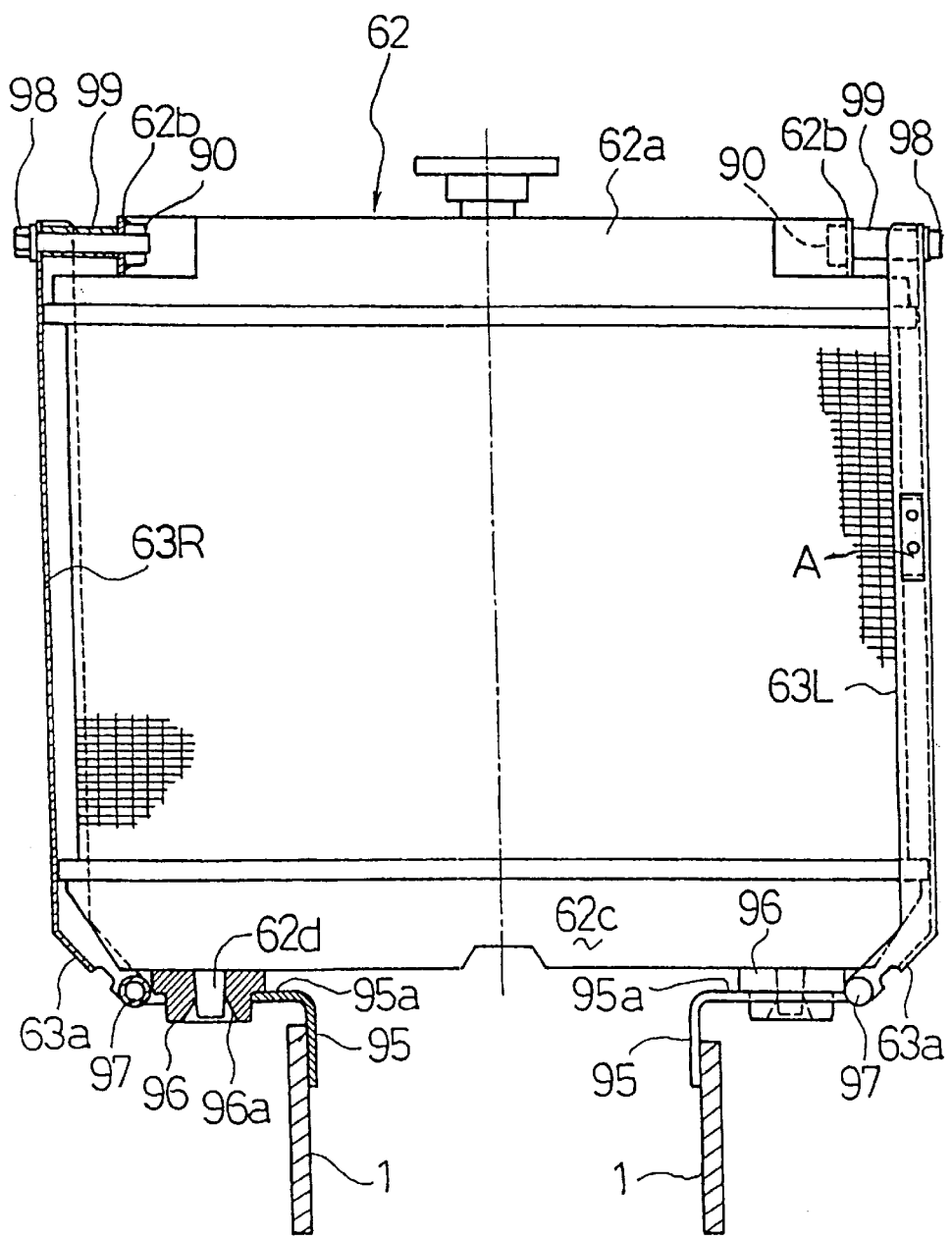
FIG. 25 is a front view of radiator 62 after assembling.
Figure 26:
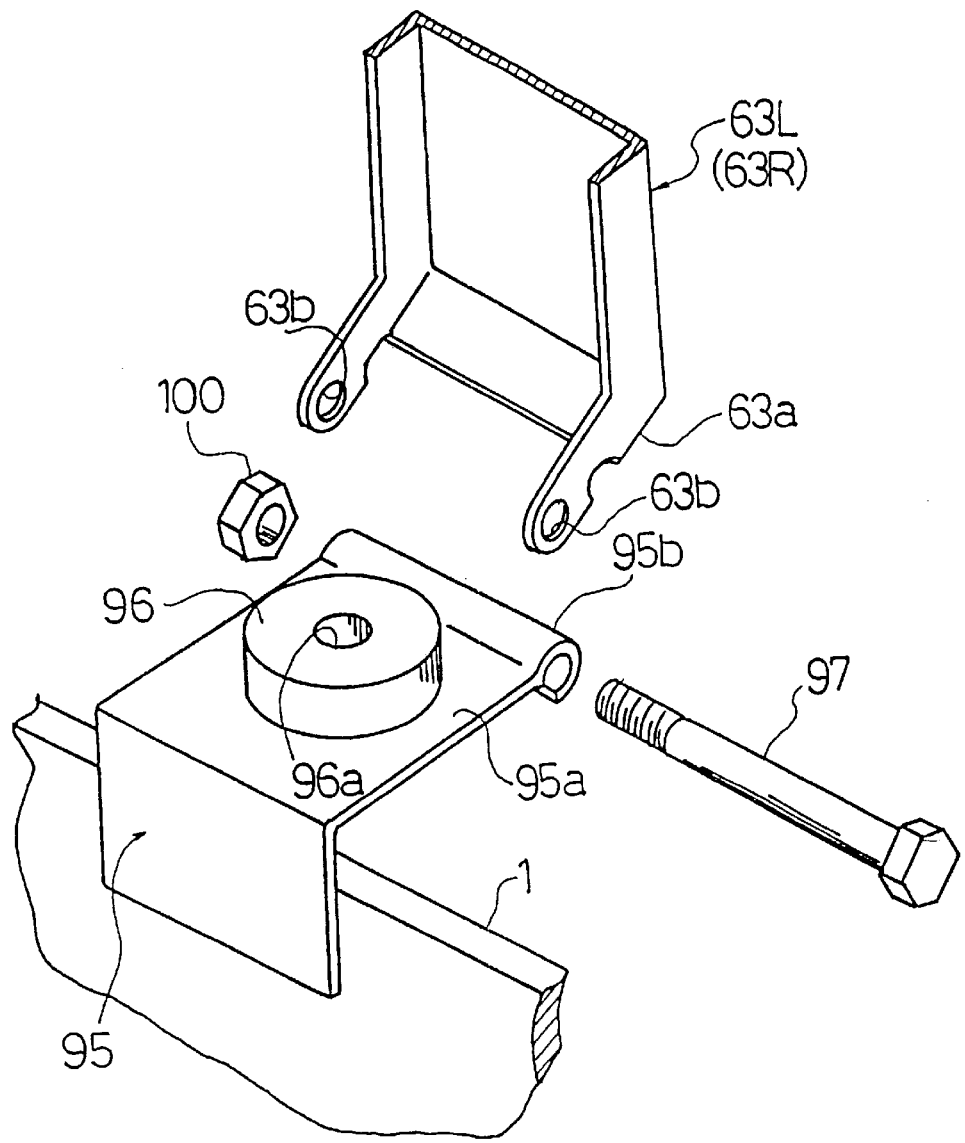
FIG. 26 is a perspective view of an assembly for pivoting radiator support frame 63L or 63R.

To fix radiator 62 onto engine frame 1, first the lower portion of radiator 62 is inserted downwardly into the pair of radiator support frames 63L and 63R, which are slanted outwardly like radiator support frame 63L is shown to be in FIG. 24. The pair of engagement projections 62d projecting from the lower portion of radiator 62 are inserted into engagement holes 96a, so as to mount the bottom of radiator 62 on mounting members 96. Left and right radiator support frames 63L and 63R are rotated inwardly according to the arrow shown in FIG. 24 so as to align with the sides of radiator 62. Bolts 98 at the upper portions of radiator support frames 63L and 63R are screwed into nuts 90 of radiator 62. Thus, radiator 62 is sandwiched at its sides between the pair of radiator support frames 63L and 63R and is mounted on engine frame 1 through the pair of mounting members 96 as shown in FIG. 25. Front cover 65 is fixed into engaging members A on erected radiator support frames 63L and 63R, and side covers 66L and 66R are fixed into engaging members B on erected radiator support frames 63L and 63R.

The mounting of radiator 62 on engine frame 1 according to the above described manner brings the following advantages:

Since front cover 65 and side covers 66L and 66R are attached and supported onto radiator support frames 63L and 63R, which support radiator 62, it is unnecessary to provide members for supporting the covers in addition to the members for supporting radiator 62, thereby reducing the number of assemblies required. Thus, the construction housed within the covers can be simplified and the space for assembly of radiator 62 can be expanded, so as to ease the assembly of radiator 62. Furthermore, the covers can be reduced in proportion to the reduction of the number of supporting members, so that the longitudinal length of the working vehicle body can be shortened, thereby lightening the working vehicle and reducing the cost of the working vehicle.

What is claimed is:

1. A frame structure for a working vehicle having an engine and a transmission casing comprising:

an engine mounting part mounted onto said engine;

a transmission casing mounting part mounted onto said transmission casing;

a transmitting shaft covering part, wherein said transmitting shaft covering part is formed of two parts joined with each other; and wherein each of said two parts of said transmitting shaft covering part has one end fixed to said engine mounting part and another end fixed to said transmission casing mounting part so as to integrally connect said engine with said transmission casing.

2. A frame structure for a working vehicle as set forth in claim 1, further comprising:

a reinforcing member; and a transmitting shaft disposed in said transmitting shaft covering part;

wherein said transmitting shaft covering part is separable laterally into said two parts and said reinforcing member is disposed between said two parts and below said transmitting shaft.

3. A frame structure for a working vehicle as set forth in claim 2, wherein said engine mounting part is formed in the shape of a bowl;

wherein one end of said transmitting shaft covering part is fixed onto a bottom portion of an external wall of said bowl-shaped engine mounting part; and wherein a mounting plate for supporting a steering unit is disposed between an upper portion of the external wall of said bowl-shaped engine mounting part and said one end of said transmitting shaft covering part.

4. A frame structure for a working vehicle as set forth in claim 1, wherein said engine mounting part is formed in the shape of a bowl;

wherein an edge of an opening of said bowl-shaped engine mounting part is bent outwardly so as to form a flange for mounting said engine mounting part onto said engine; and wherein a reinforcing member is fixed onto a surface of said flange.

5. A frame structure for a working vehicle as set forth in claim 1, wherein said transmission casing mounting part is flat plate with a shape corresponding to the shape of the front surface of said transmission casing; and wherein an expanded portion is formed at said other end of said transmitting shaft covering part and an edge of an opening of said expanded portion is fixed onto said transmission casing.

6. A frame structure for a working vehicle having an engine and a transmission casing comprising:

a frame disposed between said engine and said transmission casing;

a mounting plate comprising an upper plate portion and a pair of leg plate portions disposed at ends of said upper plate portion, wherein said mounting plate is disposed on an upper surface of said frame;

a steering column attached to an upper surface of said upper plate portion;

a steering shaft disposed in said steering column; and a changing apparatus, attached to a lower surface of said upper plate portion and connected with said steering shaft, wherein said changing apparatus changes the rotational movement of said steering shaft into the steering movement of wheels disposed on the vehicle.

7. A frame structure of for working vehicle as set forth in claim 6, further comprising:

a flange disposed at a base portion of said steering column; and a casing housing said changing apparatus;

wherein said flange and said casing are screwed together through said mounting plate.

8. A frame structure for a working vehicle having an engine and a transmission casing comprising:

a frame disposed between said engine and said transmission casing;

a mounting plate comprising an upper plate portion and a pair of leg plate portions disposed at ends of said upper plate portion, wherein said mounting plate is disposed on an upper surface of said frame;

a steering column attached to an upper surface of said upper plate portion;

a steering shaft disposed in said steering column; and a hydraulic control valve, attached to a lower surface of said upper plate portion and in connection with said steering shaft, wherein said hydraulic control valve changes the rotational movement of said steering shaft into the expansion and contraction of a power steering member for steering wheels disposed on the vehicle.

9. A frame structure of a working vehicle as set forth in claim 8, further comprising:

a flange disposed at a base portion of said steering column; and a casing housing said control valve;

wherein said flange and said casing are screwed together though said mounting plate.

* * * * *